(12) United States Patent
Luttrell et al.

(10) Patent No.: US 6,386,855 B1
(45) Date of Patent: May 14, 2002

(54) CUBE CORNER SHEETING MOLD AND OF MAKING THE SAME

(75) Inventors: Dan E. Luttrell, Corning, NY (US); Robert L. Erwin, Rohnert Park, CA (US); Kenneth L. Smith, White Bear Lake; Gerald M. Benson, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/965,389

(22) Filed: Sep. 27, 2001

Related U.S. Application Data

(63) Continuation of application No. 09/636,520, filed on Aug. 9, 2000, now Pat. No. 6,318,987, which is a continuation of application No. 08/886,074, filed on Jul. 2, 1997, now abandoned.

(51) Int. Cl.[7] .......................... B41B 11/54; B29D 11/00

(52) U.S. Cl. .................. 425/193; 249/117; 249/160; 264/1.9; 264/2.5; 359/529; 425/470; 425/DIG. 30

(58) Field of Search .................. 264/1.9, 2.5, 1.31, 264/1.33, 1.34; 425/193, 195, 470, DIG. 30; 395/529; 249/117, 156, 157, 160, 163

(56) References Cited

U.S. PATENT DOCUMENTS

| | | |
|---|---|---|
| 835,648 A | 11/1906 | Straubel |
| 1,591,572 A | 7/1926 | Stimson |
| 1,906,655 A | 5/1933 | Stimson |
| 2,205,638 A | 6/1940 | Stimson |
| 2,538,638 A | 1/1951 | Wilson |
| 2,723,595 A | 11/1955 | Rupert |
| 3,069,721 A | 12/1962 | Arni et al. |

(List continued on next page.)

FOREIGN PATENT DOCUMENTS

| | | |
|---|---|---|
| DE | 19 17 292 | 10/1970 |
| DE | 92 17 179 | 6/1993 |
| DE | 42 36 799 C2 | 5/1994 |
| DE | 42 36 799 A1 | 5/1994 |
| DE | 42 40 680 A1 | 6/1994 |

(List continued on next page.)

OTHER PUBLICATIONS

Cooke, "Optical Activities In Industry," *Applied Optics,* vol. 20, No. 8, Apr. 15, 1981.
Eckhardt, H.D., "Simple Model of Corner Reflector Phenomena," *Applied Optics,* Jul., 1971, vol. 10, No. 7.

(List continued on next page.)

*Primary Examiner*—Duane S. Smith
(74) *Attorney, Agent, or Firm*—Stephen C. Jensen

(57) ABSTRACT

Laminae suitable for use in molds for forming retroreflective cube corner elements and methods for making such laminae are disclosed. A representative lamina includes a first row of cube corner elements disposed in a first orientation and a second row of optically opposing cube corner elements disposed. The working surface of a lamina is provided with a plurality of cube corner elements formed by the optical surfaces defined by three groove sets. Opposing first and second groove sets are formed in the working surface of a lamina. The first groove set forms a plurality of structures having first and second optical surfaces disposed in mutually perpendicular planes that intersect along a reference edge. The second groove set forms a corresponding plurality of structures on the opposite side of the lamina. A third groove is formed in the working surface of the lamina along an axis substantially perpendicular to the axes of the grooves of the first and second groove sets. The surfaces of the third groove intersect the surfaces of the plurality of structures in substantially mutually perpendicular planes to define a plurality of cube corner elements. A plurality of such laminae can be assembled to form a mold useful in the manufacture of retroreflective products such as cube corner sheeting.

12 Claims, 10 Drawing Sheets

U.S. PATENT DOCUMENTS

| | | |
|---|---|---|
| 3,190,178 A | 6/1965 | McKenzie |
| 3,277,535 A | 10/1966 | Rupert |
| 3,363,875 A | 1/1968 | Hedgewick et al. |
| 3,417,959 A | 12/1968 | Schultz |
| 3,443,281 A | 5/1969 | Walby |
| 3,541,606 A | 11/1970 | Heenan et al. |
| 3,632,695 A | 1/1972 | Howell |
| 3,649,153 A | 3/1972 | Brudy |
| 3,684,348 A | 8/1972 | Rowland |
| 3,712,706 A | 1/1973 | Stamm |
| 3,810,804 A | 5/1974 | Rowland |
| 3,873,184 A | 3/1975 | Heenan |
| 3,899,154 A | 8/1975 | Tanaka |
| 3,922,065 A | 11/1975 | Schultz |
| 3,923,378 A | 12/1975 | Heenan |
| 3,924,928 A | 12/1975 | Trimble |
| 3,926,402 A | 12/1975 | Heenan |
| 3,948,714 A | 4/1976 | Steiner et al. |
| 4,025,159 A | 5/1977 | McGrath |
| RE29,396 E | 9/1977 | Heenan |
| 4,066,236 A | 1/1978 | Lindner |
| 4,066,331 A | 1/1978 | Lindner |
| 4,095,773 A | 6/1978 | Lindner |
| 4,208,090 A | 6/1980 | Heenan |
| 4,478,769 A | 10/1984 | Pricone et al. |
| 4,588,258 A | 5/1986 | Hoopman |
| 4,601,861 A | 7/1986 | Pricone et al. |
| 4,733,946 A | 3/1988 | Cossetti |
| 4,775,219 A | 10/1988 | Appeldorn et al. |
| 5,066,098 A | 11/1991 | Kult et al. |
| 5,138,488 A | 8/1992 | Szczech |
| 5,156,863 A | 10/1992 | Pricone et al. |
| 5,300,263 A | 4/1994 | Hoopman et al. |
| 5,450,235 A | 9/1995 | Smith et al. |
| 5,512,219 A | 4/1996 | Rowland et al. |
| 5,557,836 A | 9/1996 | Smith et al. |
| 5,564,870 A | 10/1996 | Benson et al. |
| 5,565,151 A | 10/1996 | Nilsen |
| 5,585,164 A | 12/1996 | Smith et al. |
| 5,600,484 A | 2/1997 | Benson et al. |
| 5,691,846 A | 11/1997 | Benson, Jr. et al. |
| 5,734,501 A | 3/1998 | Smith |
| 5,764,413 A | 6/1998 | Smith et al. |
| 5,898,523 A | 4/1999 | Smith et al. |
| 5,914,813 A | 6/1999 | Smith et al. |
| 5,981,032 A | 11/1999 | Smith et al. |
| 6,015,214 A | 1/2000 | Heenan et al. |
| 6,114,009 A | 9/2000 | Smith |
| 6,120,881 A | 9/2000 | Smith et al. |
| 6,159,407 A | 12/2000 | Krinke et al. |
| 6,253,442 B1 | 7/2001 | Benson et al. |
| 6,257,860 B1 | 7/2001 | Luttrell et al. |
| 6,318,987 B1 * | 11/2001 | Luttrell et al. .............. 425/193 |

FOREIGN PATENT DOCUMENTS

| | | |
|---|---|---|
| DE | 44 10 994 C2 | 1/1996 |
| DE | 44 29 683 C1 | 3/1996 |
| DE | 297 01 903 U1 | 5/1997 |
| FR | 1289029 | 4/1961 |
| JP | 8-309851 | 11/1996 |
| WO | WO 94/18581 | 8/1994 |
| WO | WO 95/11464 | 4/1995 |
| WO | WO 96/42024 | 12/1996 |
| WO | WO 96/42025 | 12/1996 |
| WO | WO 97/04939 | 2/1997 |
| WO | WO 97/04940 | 2/1997 |
| WO | WO 97/27035 | 7/1997 |
| WO | WO 97/45255 | 12/1997 |

OTHER PUBLICATIONS

American Society for Testing and Materials, ASTM Designation E808–94, "Standard Practice for Describing Retroreflection" *1994 Annual Book of ASTM Standards,* vol. 6.01, Apr. 1994.

Dan E. Luttrell, et al., "Cube Corner Sheeting Mold and Method of Making the Same", USSN 09/636,520, filed Aug. 9, 2000.

Gerald M. Benson, "Retroreflective Cube Corner Sheeting Mold and Method for Making the Same", USSN 09/764,477, filed Jan. 17, 2001.

Kenneth L. Smith, et al., "Retroreflective Cube Corner Sheeting Mold and Sheeting Formed Therefrom", USSN 09/650,695, filed Aug. 29, 2000.

Kenneth L. Smith, et al., "Retroreflective Cube Corner Sheeting, Molds Therefore, and Methods of Making the Same", USSN 09/656,671, filed Sep. 7, 2000.

Kenneth L. Smith, et al., "Retroreflective Cube Corner Sheeting, Molds Therefore, and Methods of Making the Same", USSN 09/656,697, filed Sep. 7, 2000.

* cited by examiner

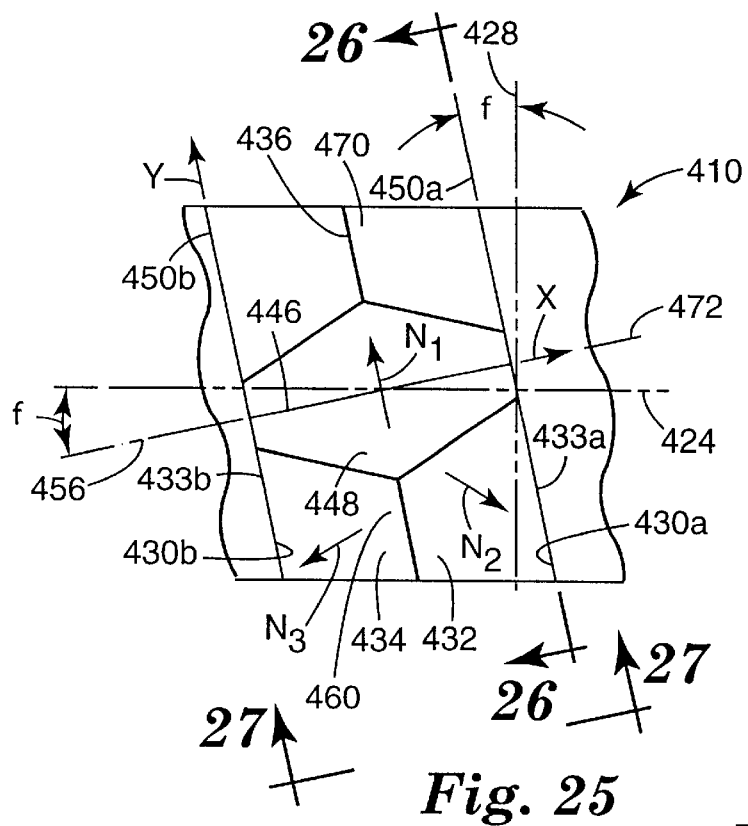
*Fig. 25*
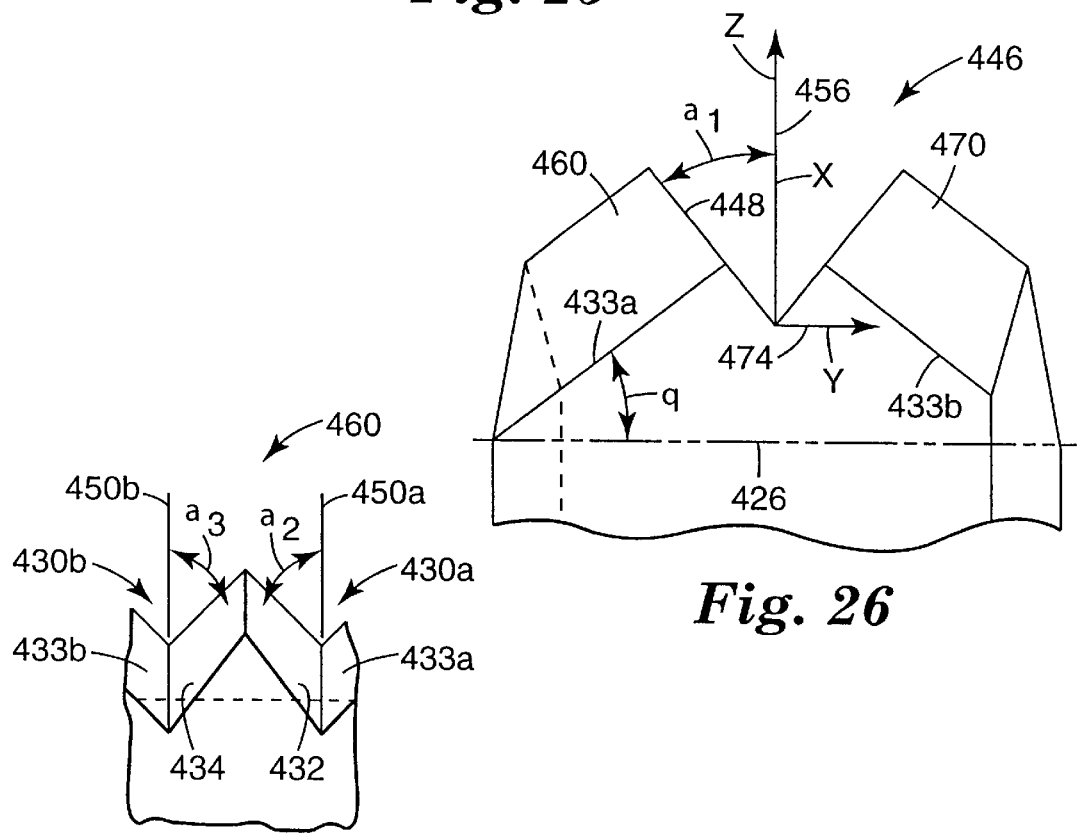
*Fig. 26*
*Fig. 27*

CUBE CORNER SHEETING MOLD AND OF MAKING THE SAME

CROSS-REFERENCE TO RELATED APPLICATIONS

This is a continuation application of prior U.S. patent application Ser. No. 09/636,520, filed Aug. 9, 2000, now allowed as U.S. Pat. No. 6,318,987, which is a continuation of prior U.S. patent application Ser. No. 08/886,074, filed Jul. 2, 1997, now abandoned.

FIELD OF THE INVENTION

The present invention relates generally to molds suitable for use in forming cube corner retroreflective sheeting and to methods for making the same. In particular, the present invention relates to molds formed from a plurality of thin laminae and to methods for making the same.

BACKGROUND OF THE INVENTION

Retroreflective materials are characterized by the ability to redirect light incident on the material back toward the originating light source. This property has led to the widespread use of retroreflective sheeting in a variety of conspicuity applications. Retroreflective sheeting is frequently used on flat, rigid articles such as, for example, road signs and barricades; however, it is also used on irregular or flexible surfaces. For example, retroreflective sheeting can be adhered to the side of a truck trailer, which requires the sheeting to pass over corrugations and protruding rivets, or the sheeting can be adhered to a flexible body portion such as a road worker's safety vest or other such safety garment. In situations where the underlying surface is irregular or flexible, the retroreflective sheeting desirably possesses the ability to conform to the underlying surface without sacrificing retroreflective performance. Additionally, retroreflective sheeting is frequently packaged and shipped in roll form, thus requiring the sheeting to be sufficiently flexible to be rolled around a core.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Illustrative examples are disclosed in U.S. Pat. No. 3,190,178 (McKenzie), U.S. Pat. No. 4,025,159 (McGrath), and U.S. Pat. No. 5,066,098 (Kult). Advantageously, microsphere-based sheeting can generally be adhered to corrugated or flexible surfaces. Also, due to the symmetrical geometry of beaded retroreflectors, microsphere based sheeting exhibits a relatively orientationally uniform total light return when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting comprises a body portion typically having a substantially planar base surface and a structured surface comprising a plurality of cube corner elements opposite the base surface. Each cube corner element comprises three mutually substantially perpendicular optical faces that intersect at a single reference point, or apex. The base of the cube corner element acts as an aperture through which light is transmitted into the cube corner element. In use, light incident on the base surface of the sheeting is refracted at the base surface of the sheeting, transmitted through the bases of the cube corner elements disposed on the sheeting, reflected from each of the three perpendicular cube corner optical faces, and redirected toward the light source. The symmetry axis, also called the optical axis, of a cube corner element is the axis that extends through the cube corner apex and forms an equal angle with the three optical faces of the cube corner element. Cube corner elements typically exhibit the highest optical efficiency in response to light incident on the base of the element roughly along the optical axis. The amount of light retroreflected by a cube corner retroreflector drops as the incidence angle deviates from the optical axis.

The maximum retroreflective efficiency of cube corner retroreflective sheeting is a function of the geometry of the cube corner elements on the structured surface of the sheeting. The terms 'active area' and 'effective aperture' are used in the cube corner arts to characterize the portion of a cube corner element that retroreflects light incident on the base of the element. A detailed teaching regarding the determination of the active aperture for a cube corner element design is beyond the scope of the present disclosure. One procedure for determining the effective aperture of a cube corner geometry is presented in Eckhardt, Applied Optics, v. 10, n. 7, July, 1971, pp. 1559–1566. U.S. Pat. No. 835,648 to Straubel also discusses the concept of effective aperture. At a given incidence angle, the active area can be determined by the topological intersection of the projection of the three cube corner faces onto a plane normal to the refracted incident light with the projection of the image surfaces for the third reflections onto the same plane. The term 'percent active area' is then defined as the active area divided by the total area of the projection of the cube corner faces. The retroreflective efficiency of retroreflective sheeting correlates directly to the percentage active area of the cube corner elements on the sheeting.

Additionally, the optical characteristics of the retroreflection pattern of retroreflective sheeting are, in part, a function of the geometry of the cube corner elements. Thus, distortions in the geometry of the cube corner elements can cause corresponding distortions in the optical characteristics of the sheeting. To inhibit undesirable physical deformation, cube corner elements of retroreflective sheeting are typically made from a material having a relatively high elastic modulus sufficient to inhibit the physical distortion of the cube corner elements during flexing or elastomeric stretching of the sheeting. As discussed above, it is frequently desirable that retroreflective sheeting be sufficiently flexible to allow the sheeting to be adhered to a substrate that is corrugated or that is itself flexible, or to allow the retroreflective sheeting to be wound into a roll to facilitate storage and shipping.

Cube corner retroreflective sheeting is manufactured by first manufacturing a master mold that includes an image, either negative or positive, of a desired cube corner element geometry. The mold can be replicated using nickel electroplating, chemical vapor deposition or physical vapor deposition to produce tooling for forming cube corner retroreflective sheeting. U.S. Pat. No. 5,156,863 to Pricone, et al. provides an illustrative overview of a process for forming tooling used in the manufacture of cube corner retroreflective sheeting. Known methods for manufacturing the master mold include pin-bundling techniques, direct machining techniques, and laminate techniques. Each of these techniques has benefits and limitations.

In pin bundling technique, a plurality of pins, each having a geometric shape on one end, are assembled together to form a cube-corner retroreflective surface. U.S. Pat. No. 1,591,572 (Stimson), U.S. Pat. No. 3,926,402 (Heenan), 3,541,606 (Heenan et al.) and U.S. Pat. No. 3,632,695 (Howell) provide illustrative examples. Pin bundling techniques offer the ability to manufacture a wide variety of cube corner geometries in a single mold. However, pin bundling techniques are economically and technically impractical for making small cube corner elements (e.g. less than about 1.0 millimeters).

In direct machining techniques, a series of grooves is formed in a unitary substrate to form a cube-corner retroreflective surface. U.S. Pat. No. 3,712,706 (Stamni) and U.S. Pat. No. 4,588,258 (Hoopman) provide illustrative examples. Direct machining techniques offer the ability to accurately machine very small cube corner elements which are compatible with flexible retroreflective sheeting. However, it is not presently possible to produce certain cube corner geometries that have very high effective apertures at low entrance angles using direct machining techniques. By way of example, the maximum theoretical total light return of the cube corner element geometry depicted in U.S. Pat. No. 3,712,706 is approximately 67%.

In laminate techniques, a plurality of laminae, each lamina having geometric shapes on one end, are assembled to form a cube-corner retroreflective surface. German Provisional Publication (OS) 19 17 292, International Publication Nos. WO 94/18581 (Bohn, et al.), WO 97/04939 (Mimura et al.), and WO 97/04940 (Mimura et al.), disclose a molded reflector wherein a grooved surface is formed on a plurality of plates. The plates are then tilted by a certain angle and each second plate is shifted crosswise. This process results in a plurality of cube corner elements, each element formed by two machined surfaces on a first plate and one side surface on a second plate. German Patent DE 42 36 799 to Gubela discloses a method for producing a molding tool with a cubical surface for the production of cube corners. An oblique surface is ground or cut in a first direction over the entire length of one edge of a band. A plurality of notches are then formed in a second direction to form cube corner reflectors on the band. Finally, a plurality of notches are formed vertically in the sides of the band. German Provisional Patent 44 10 994 C2 to Gubela is a related patent. The reflectors disclosed in Patent 44 10 994 C2 are characterized by the reflecting surfaces having concave curvature.

BRIEF SUMMARY OF THE INVENTION

The present invention relates to providing a master mold suitable for use in forming retroreflective sheeting from a plurality of laminae and methods of making the same. Advantageously, master molds manufactured according to methods disclosed herein enable the manufacture of retroreflective cube corner sheeting that exhibits retroreflective efficiency levels approaching 100%. To facilitate the manufacture of flexible retroreflective sheeting, the disclosed methods enable the manufacture of cube corner retroreflective elements having a width of 0.010 millimeters or less. Additionally, the present application enables the manufacture of a cube corner retroreflective sheeting that exhibits symmetrical retroreflective performance in at least two different orientations.

Efficient, cost-effective methods of making molds formed from a plurality of laminae are also disclosed. In particular, a reduction of the number of laminae necessary to produce a given density of cube corner elements in a sheeting is disclosed, thereby reducing the time and expense associated with manufacturing such molds.

In one embodiment, a lamina suitable for use in a mold for use in forming retroreflective cube corner articles is provided, the lamina having opposing first and second major surfaces defining therebetween a first reference plane, the lamina further including a working surface connecting the first and second major surfaces, the working surface defining a second reference plane substantially parallel to the working surface and perpendicular to the first reference plane and a third reference plane perpendicular to the first reference plane and the second reference plane. The lamina includes: (a) a first groove set including at least two parallel adjacent V-shaped grooves in the working surface of the lamina, each of the adjacent grooves defining a first groove surface and a second groove surface that intersect substantially orthogonally to form a first reference edge; (b) a second groove set including at least two parallel adjacent V-shaped grooves in the working surface of the lamina, each of the adjacent grooves defining a third groove surface and a fourth groove surface that intersect substantially orthogonally to form a second reference edge; and (c) a third groove set including at least one groove in the working surface of the lamina, the groove defining a fifth groove surface and a sixth groove surface, the fifth groove surface intersecting substantially orthogonally with the first and second groove surfaces to form at least one first cube corner disposed in a first orientation and the sixth groove surface intersecting substantially orthogonally with the third and fourth groove surfaces to form at least one second cube corner disposed in a second orientation different than the first orientation.

In one embodiment, the first and second groove sets are formed such that their respective reference edges extend along axes that, in a top plan view, are perpendicular to the first reference plane. The third groove set includes a single groove having a vertex that extends along an axis contained by the third reference plane. In this embodiment, the lamina comprises a first row of cube corner elements defined by the grooves of the first groove set and the third groove and a second row of cube corner elements defined by the grooves of the second groove set and the third groove.

The three mutually perpendicular optical faces of each cube corner element are preferably formed on a single lamina. All three optical faces are preferably formed by the machining process to ensure optical quality surfaces. A planar interface is preferably maintained between adjacent first and second major surfaces during the machining phase and subsequent thereto so as to minimize alignment problems and damage due to handling of the laminae.

Also disclosed is a method of manufacturing a lamina for use in a mold suitable for use in forming retroreflective cube corner articles, the lamina having opposing first and second major surfaces defining therebetween a first reference plane, the lamina further including a working surface connecting the first and second major surfaces, the working surface defining a second reference plane substantially parallel to the working surface and perpendicular to the first reference plane and a third reference plane perpendicular to the first reference plane and the second reference plane. The method includes: (a) forming a first groove set including at least two parallel adjacent V-shaped grooves in the working surface of the lamina, each of the adjacent grooves defining a first groove surface and a second groove surface that intersect substantially orthogonally to form a first reference edge; (b) forming a second groove set including at least two parallel adjacent V-shaped grooves in the working surface of the lamina, each of the adjacent grooves defining a third groove surface and a fourth groove surface that intersect substantially orthogonally to form a second reference edge; and (c)

forming a third groove set including at least one groove in the working surface of the lamina, the groove defining a fifth groove surface and a sixth groove surface, the fifth groove surface intersecting substantially orthogonally with the first and second groove surfaces to form at least one first cube corner disposed in a first orientation and the sixth groove surface intersecting substantially orthogonally with the third and fourth groove surfaces to form at least one second cube corner disposed in a second orientation different than the first orientation.

Further disclosed is a mold assembly comprising a plurality of laminae, the laminae including opposed parallel first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane. The working surface of a plurality of the learning includes: (a) a first groove set including at least two parallel adjacent V-shaped grooves in the working surface of each of the laminae, each of the adjacent grooves defining a first groove surface and a second groove surface that intersect substantially orthogonally to form a first reference edge on each of the respective laminae; (b) a second groove set including at least two parallel adjacent V-shaped grooves in the working surface of each of the learning, each of the adjacent grooves defining a third groove surface and a fourth groove surface that intersect substantially orthogonally to form a second reference edge on each of the respective laminae; and (c) a third groove set including at least one groove in the working surface of a plurality of the laminae, each groove defining a fifth groove surface and a sixth groove surface, the fifth groove surface intersecting substantially orthogonally with the first and second groove surfaces to form at least one first cube corner disposed in a first orientation and the sixth groove surface intersecting substantially orthogonally with the third and fourth groove surfaces to form at least one second cube corner disposed in a second orientation different than the first orientation.

In one embodiment of such mold assembly, the first groove set extends substantially entirely across the respective first major surfaces of the plurality of laminae and the second groove get extends substantially entirely across the respective second major surfaces of the plurality of laminae. Additionally, the first and second groove sets are formed such that their respective reference edges extend along axes that, in a top plan view, are perpendicular to the respective first reference planes. Finally, the third groove set comprises a single groove in each respective lamina having a vertex that extends along an axis parallel to the respective lamina's third reference plane. According to this embodiment, each respective lamina comprises a first row of cube corner elements defined by the grooves of the first groove set and the third groove and a second row of cube corner elements defined by the grooves of the second groove set and the third groove.

Also disclosed is a method of manufacturing a plurality of laminae for use in a mold suitable for use in forming retroreflective cube corner articles, each lamina having opposing first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane. The method includes: (a) orienting a plurality of laminae to have their respective first reference planes parallel to each other and disposed at a first angle relative to a fixed reference axis; (b) forming a first groove set including at least two parallel adjacent V-shaped grooves in the working surface of each of the laminae, each of the adjacent grooves defining a first groove surface and a second groove surface that intersect substantially orthogonally to form a first reference edge on each of the respective laminae; (c) orienting the plurality of laminae to have their respective first reference planes parallel to each other and disposed at a second angle relative to the fixed reference axis; (d) forming a second groove set including at least two parallel adjacent V-shaped grooves in the working surface of each of the laminae, each of the adjacent grooves defining a third groove surface and a fourth groove surface that intersect substantially orthogonally to form a second reference edge on each of the respective laminae; and (e) forming a third groove set including at least one groove in the working surface of a plurality of the laminae, each groove defining a fifth groove surface and a sixth groove surface, the fifth groove surface intersecting substantially orthogonally with the first and second groove surfaces to form at least one first cube corner disposed in a first orientation and the sixth groove surface intersecting substantially orthogonally with the third and fourth groove surfaces to form at least one second cube corner disposed in a second orientation different than the first orientation.

In one disclosed method, the plurality of laminae are assembled in a suitable fixture that defines a base plane. The fixture secures the laminae such that their respective first reference planes are substantially parallel and are disposed at a first angle that preferably measures between about 1° and about 85°, and more preferably measures between about 10° and about 60° relative to a fixed reference axis that is a normal vector to the base plane. The first groove set is then formed by removing portions of each of the plurality of lamina proximate the working surface of the plurality of laminae by using a suitable material removal technique such as, for example, ruling, fly-cutting, grinding, or milling. The plurality of laminae are then reassembled in the fixture and secured such that their respective first reference planes are substantially parallel and are disposed at a second angle that preferably measures between about 1° and about 85°, and more preferably measures between about 10° and about 60° relative to a fixed reference axis that is a normal vector to the base plane. The second groove set is then formed using suitable material removal techniques as describe above. The plurality of laminae are then reassembled in the fixture and secured such that their respective first reference planes are substantially parallel to the reference axis. The third groove set is then formed using suitable material removal techniques as describe above. Preferably, the third groove set defines a single groove in each respective lamina.

BRIEF DESCRIPTION OF THE DRAWINGS

FIG. 25 is a top plan view of a portion of the working surface of a single lamina.

FIG. 26 is a side elevation view of the working surface depicted in FIG. 25.

FIG. 27 is a side elevation view of the working surface depicted in FIG. 25.

DETAILED DESCRIPTION OF THE PREFERRED EMBODIMENTS

In describing various embodiments, specific terminology will be used for the sake of clarity. Such terminology is not, however, intended to be limiting and it is to be understood that each term so selected includes all technical equivalents that function similarly. Related applications filed on the same date herewith include: Retroreflective Cube Corner Sheeting Mold and Sheeting Formed Therefrom (U.S. Ser. No. 08/886,998 filed Jul. 2, 1997 now U.S. Pat. No. 5,981,032); Retroreflective Cube Corner Sheeting, Molds Therefore, and Methods of Making the Same (U.S. Ser. No. 08/887,390 filed Jul. 2, 1997); Tiled Retroreflective Sheeting Composed of Highly Canted Cube Corner Elements (U.S. Ser. No. 08/887,389 filed Jul. 2, 1997 now U.S. Pat. No. 5,989,523); Retroreflective Cube Corner Sheeting Mold and Method of Making the Same (U.S. Ser. No. 08/887,084 filed Jul. 2, 1997); and Dual Orientation Retroreflective Sheeting (U.S. Ser. No. 08/887,006 filed Jul. 2, 1997 now U.S. Pat. No. 5,936,770).

The disclosed embodiments can utilize full cube corner elements of a variety of sizes and shapes. The base edges of adjacent full cube corner elements in an array are not all in the same plane. By contrast, the base edges of adjacent truncated cube corner elements in an array are typically coplanar. Full cube corner elements have a higher total light return than truncated cube corner elements for a given amount of cant, but the full cubes lose total light return more rapidly at higher entrance angles. One benefit of full cube corner elements is higher total light return at low entrance angles, without too large of a loss in performance at higher entrance angles.

Predicted total light return (TLR) for a cube corner matched pair array can be calculated from a knowledge of percent active area and ray intensity. Ray intensity may be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is presented in U.S. Pat. No. 3,712,706 (Stamm).

Figure 1:
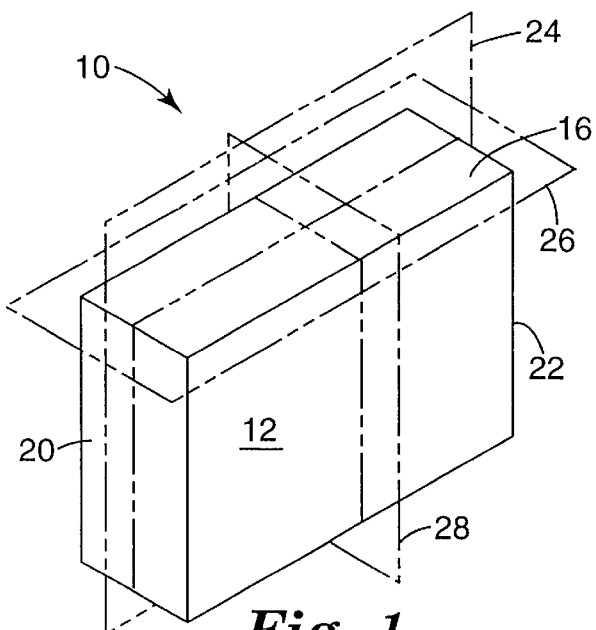
FIG. 1 is a perspective view of a single lamina suitable for use in the disclosed methods.
Figure 2:
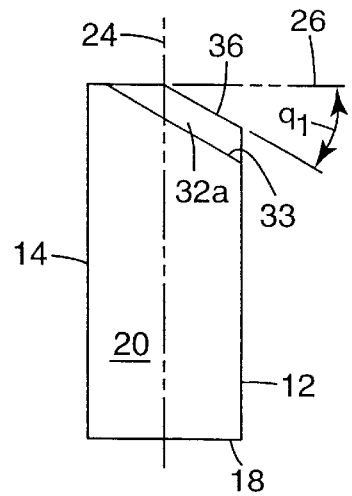
FIG. 2 is an end view of a single lamina following a first machining step.

One embodiment of a lamina, as well as a method of making the same, will now be described with reference to FIGS. 1–12. FIGS. 1–2 depict a representative lamina 10 useful in the manufacture of a mold suitable for forming retroreflective sheeting. Lamina 10 includes a first major surface 12 and an opposing second major surface 14. Lamina 10 further includes a working surface 16 and an opposing bottom surface 18 extending between first major surface 12 and second major surface 14. Lamina 10 further includes a first end surface 20 and an opposing second end surface 22. In a preferred embodiment, lamina 10 is a right rectangular polyhedron wherein opposing surfaces are substantially parallel. However, it will be appreciated that opposing surfaces of lamina 10 need not be parallel.

For purposes of description, lamina 10 can be characterized in three dimensional space by superimposing a Cartesian coordinate system onto its structure. A first reference plane 24 is centered between major surfaces 12 and 14. First reference plane 24, referred to as the x-z plane, has the y-axis as its normal vector. A second reference plane 26, referred to as the x-y plane, extends substantially coplanar with working surface 16 of lamina 10 and has the z-axis as its normal vector. A third reference plane 28, referred to as the y-z plane, is centered between first end surface 20 and second end surface 22 and has the x-axis as its normal vector. For the sake of clarity, various geometric attributes of the present embodiments will be described with reference to the Cartesian reference planes as set forth herein. However, it will be appreciated that such geometric attributes can be described using other coordinate systems or with reference to the structure of the lamina.

Figure 3:
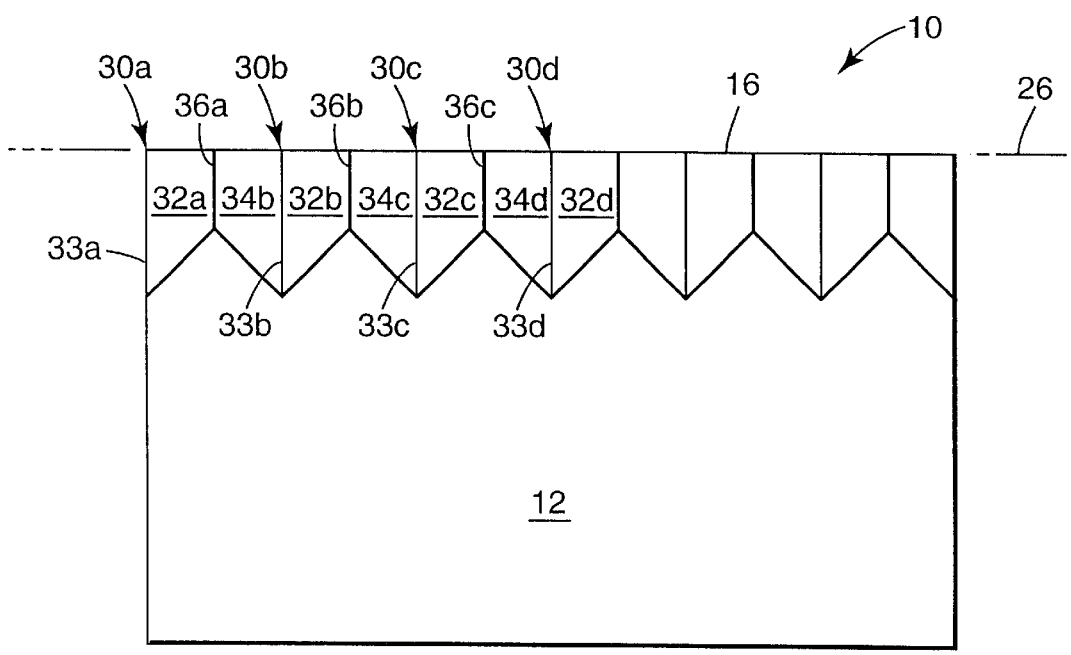
FIG. 3 is a side view of a single lamina following a first machining step.
Figure 4:
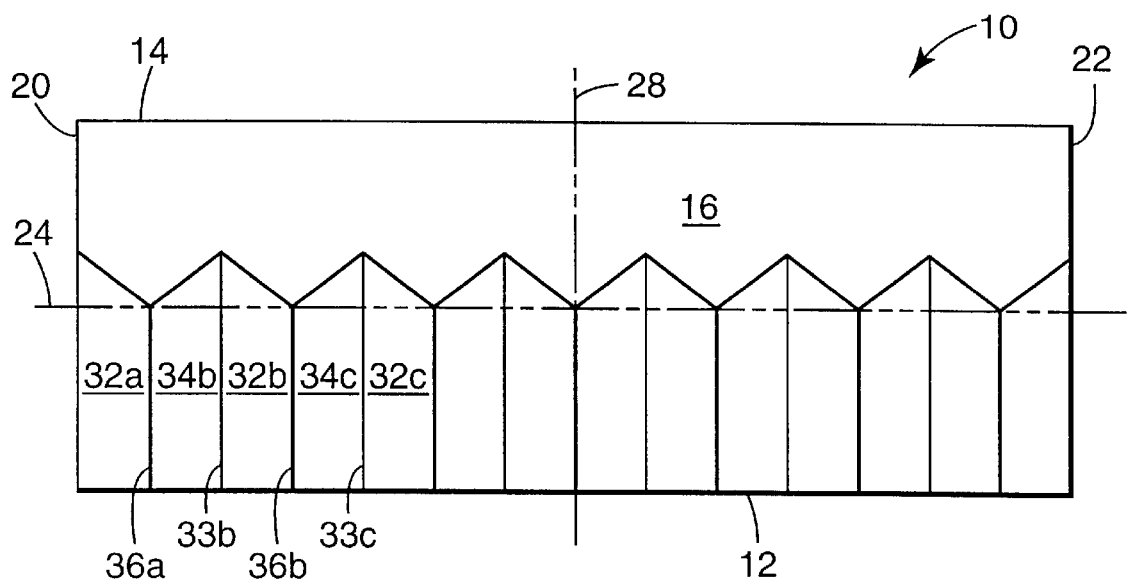
FIG. 4 is a top view of a single lamina following a first machining step.
Figure 5:
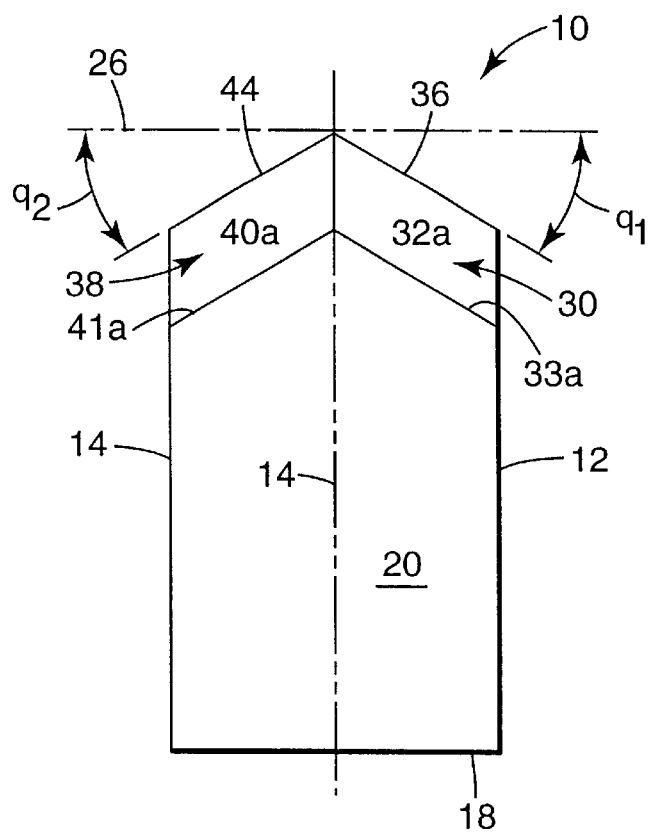
FIG. 5 is an end view of a single lamina following a second machining step.
Figure 6:
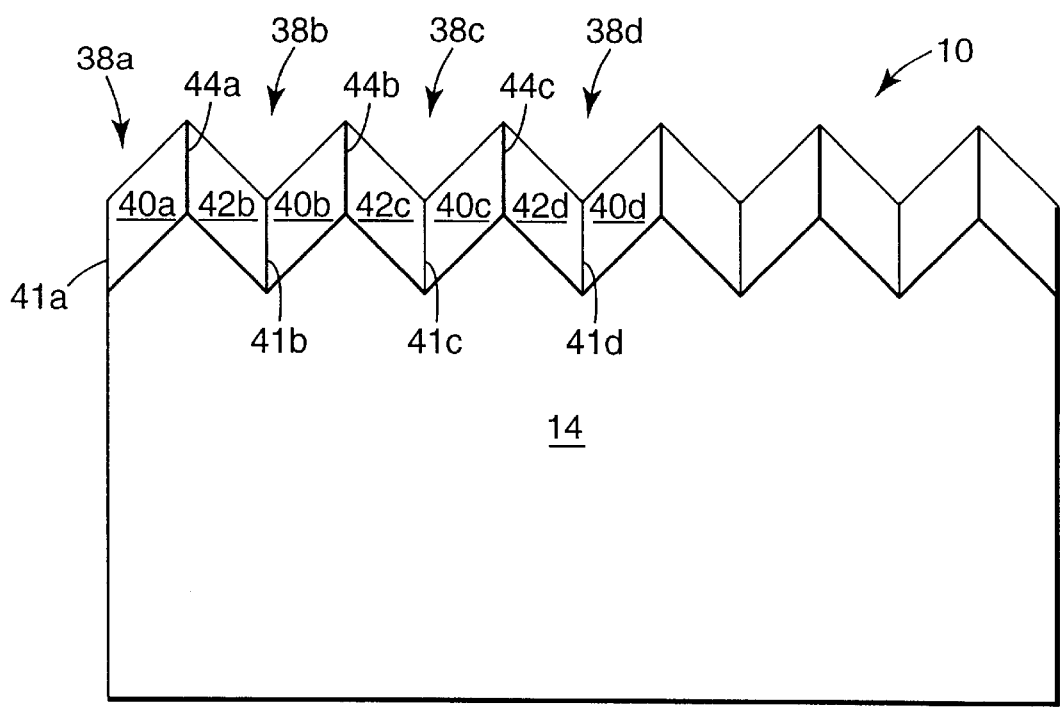
FIG. 6 is a side view of a single lamina following a second machining step.
Figure 7:
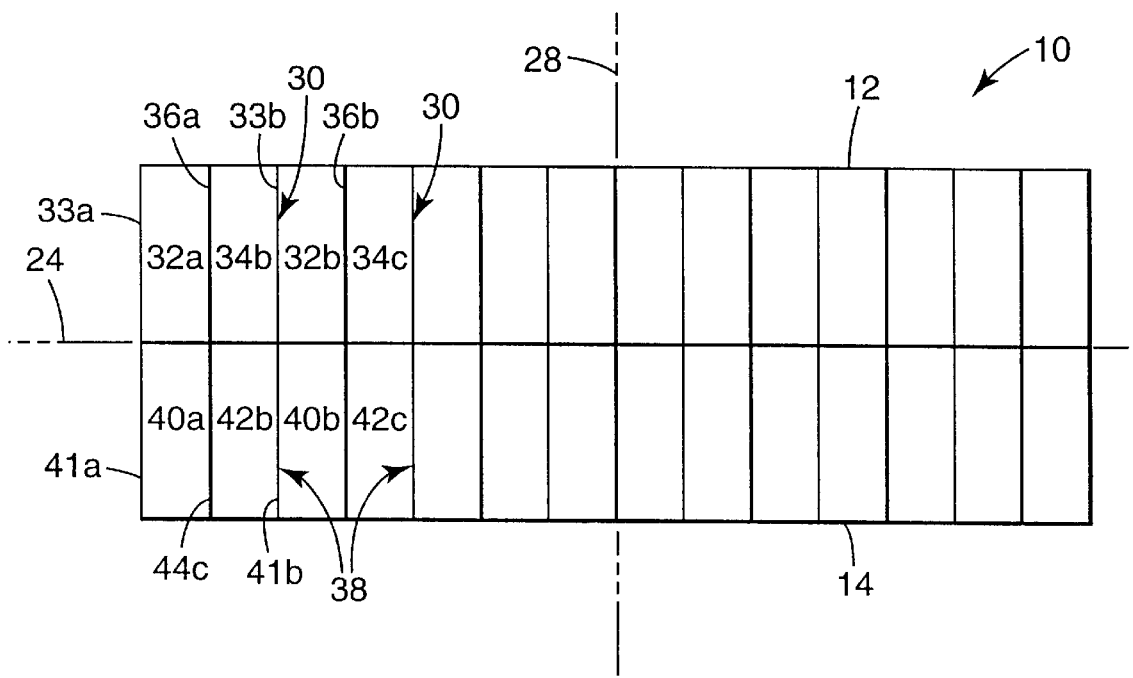
FIG. 7 is a top view of a single lamina following a second machining step.
Figure 8:
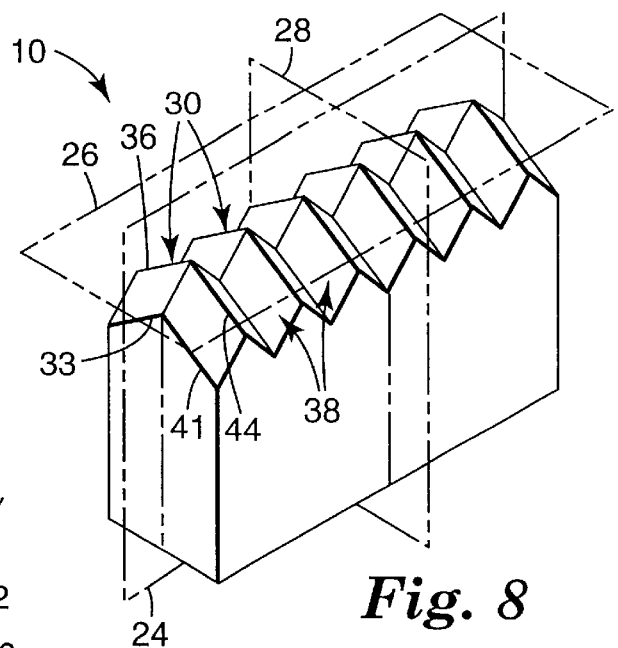
FIG. 8 is a perspective view of a single lamina following a second machining step.
Figure 11:
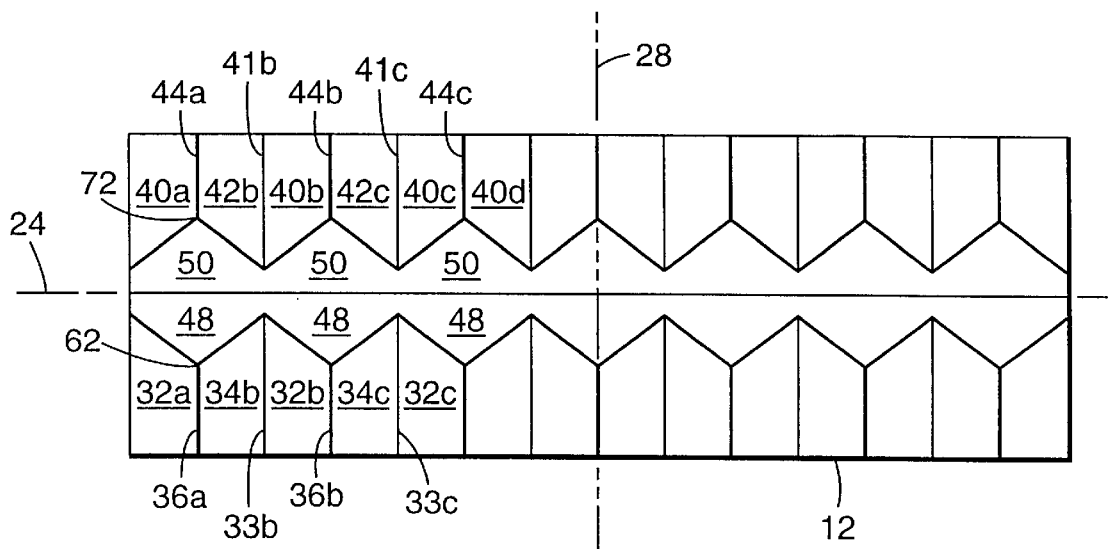
FIG. 11 is a top view of a single lamina following a third machining step.
Figure 12:
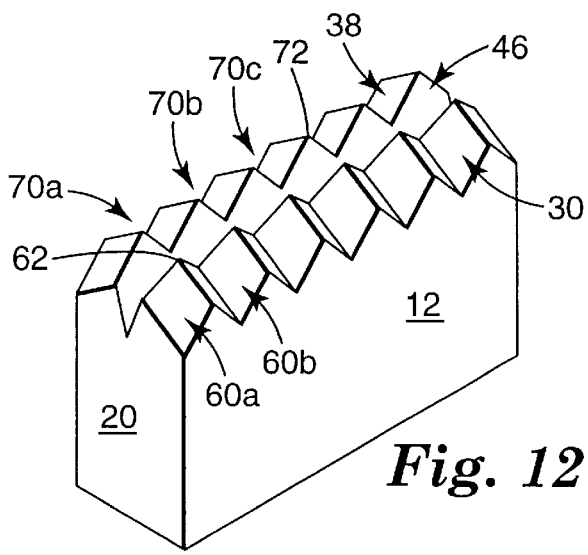
FIG. 12 is a perspective view of a single lamina following a third machining step.
Figure 13:
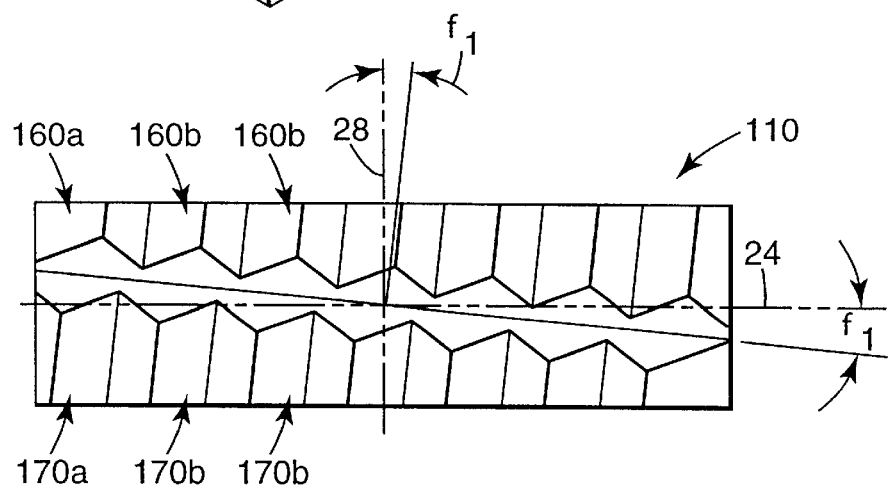
FIG. 13 is a top view of an alternate embodiment of a single lamina following a third machining step.

FIGS. 2–12 illustrate the formation of a structured surface comprising a plurality of optically opposing cube corner elements in the working surface 16 of lamina 10. In brief, according to a preferred embodiment a first groove set comprising at least two parallel, adjacent grooves 30a, 30b, 30c, etc. (collectively referred to as 30) is formed in the working surface 16 of lamina 10 (FIGS. 2–4). A second groove set comprising at least two parallel, adjacent grooves 38a, 38b, 38c, etc. (collectively referred to as 38) is also formed in the working surface 16 of lamina 10 (FIGS. 5–7). Preferably, the first and second groove sets intersect approximately along a first reference plane 24 to form a structured surface including a plurality of alternating peaks and v-shaped valleys (FIG. 8). It is not necessary for the groove sets 30, 38 to be aligned, as illustrated in FIG. 8. Alternatively, the peaks and v-shaped valleys can be off-set with respect to each other, such as illustrated in FIG. 13.

Figure 9:
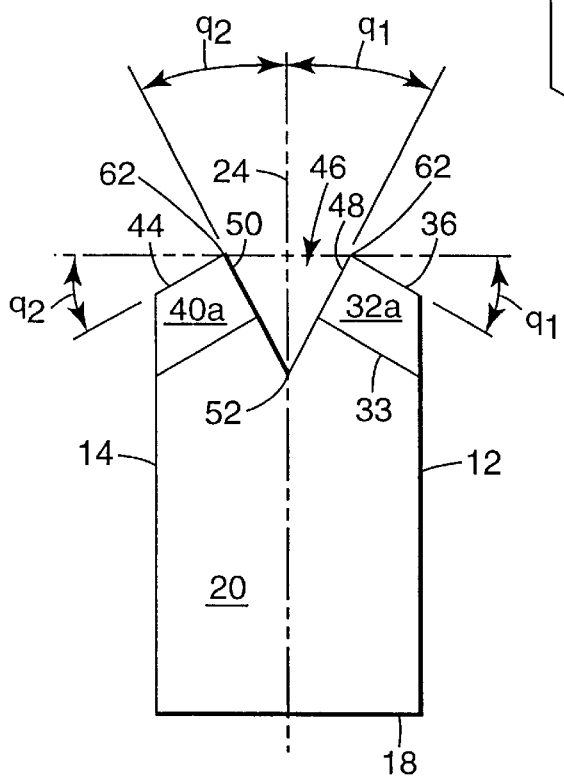
FIG. 9 is an end view of a single lamina following a third machining step.
Figure 10:
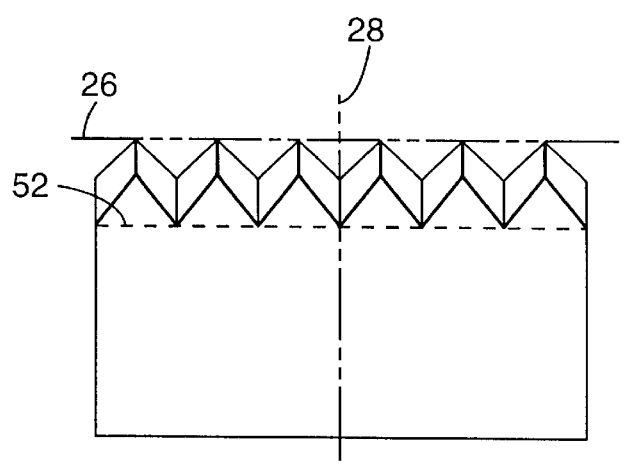
FIG. 10 is a side view of a single lamina following a third machining step.

A third groove 46 is then formed in the working surface 16 of lamina 10 (FIGS. 9–11). Preferably, third groove 46 extends along an axis approximately perpendicular to the direction in which the first and second groove sets were formed, Formation of third groove 46 results in a structured surface that includes a plurality of cube corner elements having three mutually perpendicular optical faces on the lamina (FIG. 12). As used herein, the term 'groove set' refers to all parallel grooves formed in working surface 16 of the lamina 10.

The embodiments will now be explained in greater detail. Referring to FIGS. 2–4, a first groove set comprising at least two parallel, adjacent grooves 30a, 30b, 30c, etc. (collectively referred to by the reference numeral 30) is formed in the working surface 16 of lamina 10. The grooves define first groove surfaces 32a, 32b, 32c, etc. (collectively referred to as 32) and second groove surfaces 34b, 34c, 34d, etc. (collectively referred to as 34) that intersect at groove vertices 33b, 33c, 33d, etc. (collectively referred to as 33). At the edge of the lamina, the groove forming operation may form a single groove surface 32a. Groove surfaces 32a and 34b of adjacent grooves intersect approximately orthogonally along a reference edge 36a. As used herein, the terms 'substantially orthogonally' or 'approximately orthogonally' shall mean that the dihedral angle between the respective surfaces measures approximately 90°; slight variations in orthogonality as disclosed and claimed in U.S. Pat. No. 4,775,219 to Appeldorn are contemplated. Similarly, adjacent groove surfaces 32b and 34c intersect approximately orthogonally along first reference edge 36b. Preferably this pattern is repeated across the entire working surface 16 of lamina 10 as illustrated in FIGS. 3–4. The respective groove vertices 33 are preferably separated by a distance that measures between about 0.01 millimeters and about 1.0 millimeters.

In the embodiment of FIG. 2, the grooves 30 are formed such that the respective groove vertices 33 and the respective first reference edges 36 extend along an axis that intersects the first major surface 12 and the working surface 16 of lamina 10. In this embodiment, the working surface 16 of the lamina 10 includes a portion which remains unaltered by the formation of the plurality of grooves 30. It will be appreciated that the grooves can also be formed such that the respective groove vertices 33 and first reference edges 36 extend along an axis that intersects the first major surface 12 and the second major surface 14 of lamina 10 by forming the grooves deeper into the working surface 16. Additionally, in the embodiment of FIGS. 2–4 the grooves 30 are formed such that each of the first reference edges 36 are disposed in planes that intersect the first reference plane 24 and the second reference plane 26 at orthogonal angles such that, in the top view of FIG. 4, the reference edges 36 appear perpendicular to reference plane 24.

In the embodiment of FIGS. 2–4, the grooves 30 are formed such that the first reference edges 36 are all disposed in a common plane that intersects the second reference plane 26 at an acute angle $\theta_1$ of approximately 27.8°. Grooves 30 can alternately be formed such that the reference edges 36 intersect reference plane 26 at angles different than 27.8°. In general, it is feasible to form grooves such that the respective reference edges 36 intersect reference planes 26 at any angle between about 1° and about 85°, and more preferably between about 10° and about 60°.

Referring now to FIGS. 5–8, a second groove set comprising at least two parallel, adjacent grooves 38a, 38b, 38c, etc. (collectively referred to as 38) is formed in the working surface 16 of lamina 10. Grooves 38 define third groove surfaces 40a, 40b, 40c, etc. (collectively referred to as 40) and fourth groove surfaces 42b, 42c, 42d, etc. (collectively referred to as 42) that intersect at groove vertices 41b, 41c, 41d, etc. (collectively referred to as 41) as shown. At the edge of the lamina, the groove forming operation may form a single groove surface 40a. Groove surfaces 40a and 42b of adjacent grooves intersect approximately orthogonally along a reference edge 44a, which, for the purposes of the present disclosure, means that the dihedral angle between surfaces 40a and 42b is approximately 90°. Similarly, adjacent groove surfaces 40b and 42c intersect approximately orthogonally along a second reference edge 44b. Preferably this pattern is repeated across the entire working surface 16 of lamina 10. Groove vertices 41 are preferably spaced apart by between about 0.01 millimeters and 0.10 millimeters.

Referring particularly to FIG. 5 it can be seen that the grooves 38 are formed such that the reference edges 44 extend along an axis that intersects the second major surface 14 and the working surface 16 of lamina 10. In this embodiment, the reference edges 44 (and groove vertices 41) intersect the second reference plane 26 of lamina 10 at an acute angle $\theta_2$ that measures approximately 27.8°. As discussed above, it is feasible to form grooves that intersect reference plane 26 at any angle between about 1° and 85°.

In the embodiment of FIGS. 5–8, grooves 38 are formed such that the respective reference edges 44 are disposed in planes that intersect the first reference plane 24 and second reference plane 26 at orthogonal angles such that, in the top view of FIG. 7, reference edges 44 appear perpendicular to first reference plane 24. Additionally, referring particularly to FIG. 7, grooves 38 are preferably formed such that the groove vertices 41 are substantially coplanar with groove vertices 33, and the reference edges 44 are substantially coplanar with reference edges 36. Alternatively, groove vertices 33, 41 and reference edges 36, 44 can be shifted with respect to each other. In another alternate embodiment, the depth of the groove vertices 33, 41 can vary with respect to one another.

FIG. 8 presents a perspective view of a representative lamina 10 upon completion of forming the grooves 38. Lamina 10 includes a series of grooves 30, 38 formed in the working surface 16 thereof as described above. The reference edges 36, 44 intersect approximately along the first reference plane 24 to define a plurality of peaks. Similarly, groove vertices 33, 41 intersect approximately along the first reference plane to define a plurality of valleys between the peaks.

FIGS. 9–12 illustrate an embodiment of lamina 10 following formation of a third groove 46 in lamina 10. In this embodiment third groove 46 defines a fifth groove surface 48 and a sixth groove surface 50 that intersect at a groove vertex 52 along an axis that is contained by the first reference plane 24. Importantly, third groove 46 is formed such that fifth groove surface 48 is disposed in a plane that is substantially orthogonal to the first groove surfaces 32 and the second groove surfaces 34. This can be accomplished by forming third groove 46 such that fifth groove surface 48 forms an angle equal to angle $\theta_1$ with first reference plane 24; sixth groove surface likewise preferably forms an angle equal to angle $\theta_2$ with first reference plane 24, where $\theta_1$ and $\theta_2$ are the same $\theta_1$ and $\theta_2$ illustrated in FIG. 5. Formation of the fifth groove surface 48 yields a plurality of cube corner elements 60a, 60b, etc. (collectively referred to as 60) in working surface 16 of lamina 10. Each cube corner element 60 is defined by a first groove surface 32, a second groove surface 34, and a portion of fifth groove surface 48 that mutually intersect at a point to define a cube corner peak, or apex 62. Similarly, sixth groove surface 50 is disposed in a plane that is substantially orthogonal to the third groove surfaces 40 and the fourth groove surfaces 42 that mutually intersect at a point to define a cube corner peak, or apex 72. Formation of the sixth groove surface 50 also yields a plurality of cube corner elements 70a, 70b, etc. (collectively referred to as 70) in working surface 16 of lamina 10. Each cube corner element 70 is defined by a third groove surface 40, a fourth groove surface 42 and a portion of sixth groove surface 50. Preferably, both fifth groove surface 48 and sixth groove surface 50 form a plurality of cube corner elements on the working surface 16 of lamina 10. However, it will be appreciated that third groove 46 can be formed such that only the fifth groove surface 48 or the sixth groove surface 50 forms cube corner elements.

Referring particularly to FIGS. 11 and 12, various features of lamina 10 will be discussed. In the disclosed embodiment, the dihedral angle defined by opposing surfaces of grooves 30 and 38 measures 90°. The first and second reference edges 36, 44 are disposed in planes that intersect the first reference plane 24 at an orthogonal angle and that intersect the second reference plane 26 at an orthogonal angle. Thus, in the plan view of FIG. 11, the reference edges 36 and 44 extend along axes that are substantially perpendicular to first reference plane 24. Reference edges 36 extend along axes that intersect the first major surface 12 of lamina 10 and that intersect the second reference plane 26 at an acute angle of approximately 27.8°. Reference edges 44 likewise extend along axes that intersect the second major surface 14 of lamina 10 and that intersect the second reference plane 26 at an acute angle of approximately 27.8°. The vertex of third groove 46 extends along an axis that is substantially parallel to first reference plane 24 and the dihedral angle between fifth groove surface 48 and sixth groove surface 50 is approximately 55.6°.

Preferably, working surface 16 is formed using conventional precision machining tooling and techniques such as, for example, ruling, milling, grooving, and fly-cutting. In one embodiment second major surface 14 of lamina 10 can be registered to a substantially planar surface such as the surface of a precision machining tool and each groove 30a, 30b, etc. of the first groove set can be formed in working surface 16 by moving a V-shaped cutting tool having an included angle of 90° along an axis that intersects the first working surface 12 and the second reference plane 26 at an angle $\theta_1$ of 27.8°. In the disclosed embodiment each groove 30 is formed at the same depth in the working surface and the cutting tool is moved laterally by the same distance between adjacent grooves such that grooves are substantially identical. Next, first major surface 12 of lamina 10 can be registered to the planar surface and each groove 38a, 38b, etc. can be formed in working surface 16 by moving a V-shaped cutting tool having an included angle of 90° along an axis that intersects the second working surface 14 and the second reference plane 26 at an angle $\theta_2$ of 27.8°. Finally, bottom surface 18 of lamina 10 can be registered to the planar surface and third groove 46 may be formed in working surface 16 by moving a V-shaped cutting tool having an included angle of 55.6° along an axis substantially parallel with base surface 18 and contained by first reference plane 24. While the three groove forming steps have been recited in a particular order, one of ordinary skill in the art will recognize that the order of the steps is not critical; the steps can be practiced in any order. Additionally, one of ordinary skill in the art will recognize that the three groove sets can be formed with the lamina registered in one position; the present disclosure contemplates such a method. Furthermore, the particular mechanism for securing the lamina, whether physical, chemical, or electromagnetic, is not critical.

To form a mold suitable for use in forming retroreflective articles, a plurality of laminae 10 having a working surface 16 that includes cube corner elements 60, 70 formed as described above can be assembled together in a suitable fixture. Working surface 16 is then replicated using precision replication techniques such as, for example, nickel electroplating to form a negative copy of working surface 16. Electroplating techniques are known to one of ordinary skill in the retroreflective arts. See e.g. U.S. Pat. Nos. 4,478,769 and 5,156,963 to Pricone et al. The negative copy of working surface 16 can then be used as a mold for forming retroreflective articles having a positive copy of working surface 16. More commonly, additional generations of electroformed replicas are formed and assembled together into a larger mold. It will be noted that the original working surfaces 16 of the lamina 10, or positive copies thereof, can also be used as an embossing tool to form retroreflective articles. See, JP 8-309851 and U.S. Pat. No. 4,601,861 (Pricone). Those of ordinary skill will recognize that the working surface 16 of each lamina 10 functions independently as a retroreflector. Thus, adjacent lamina in the mold need not be positioned at precise angles or distances relative to one another.

Figure 16:
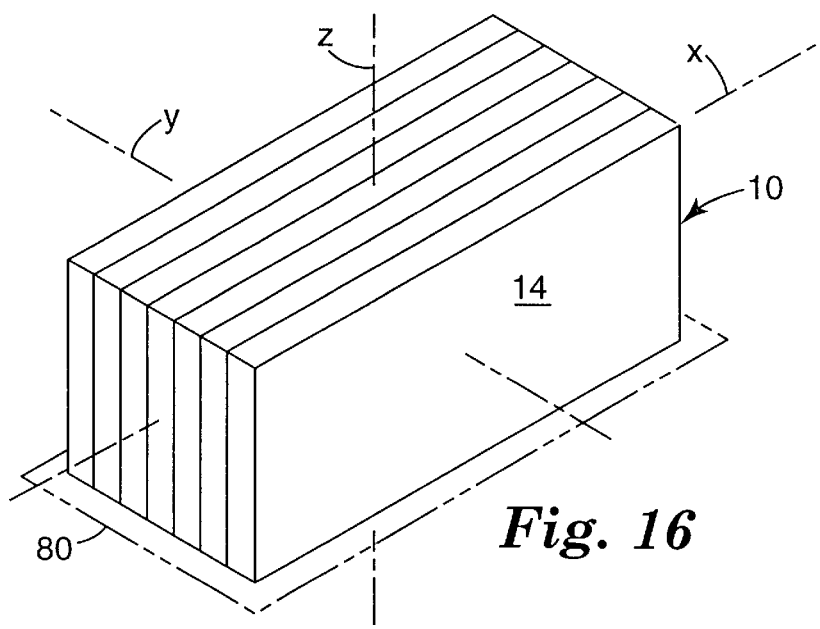
FIG. 16 is a perspective view of a plurality of laminae.
Figure 17:
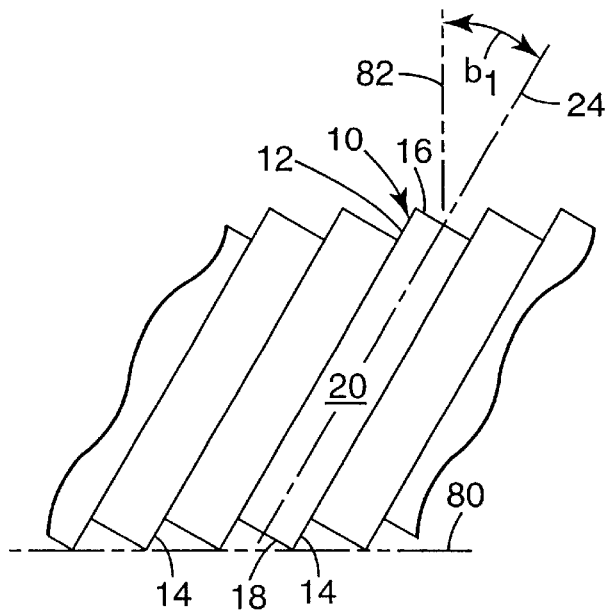
FIG. 17 is an end view of the plurality of laminae oriented in a first orientation.
Figure 18:
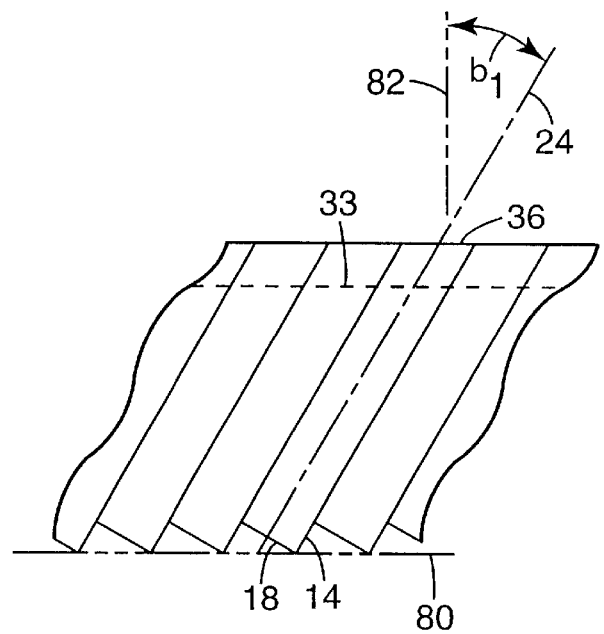
FIG. 18 is an end view of the plurality of laminae following a first machining operation.
Figure 19:
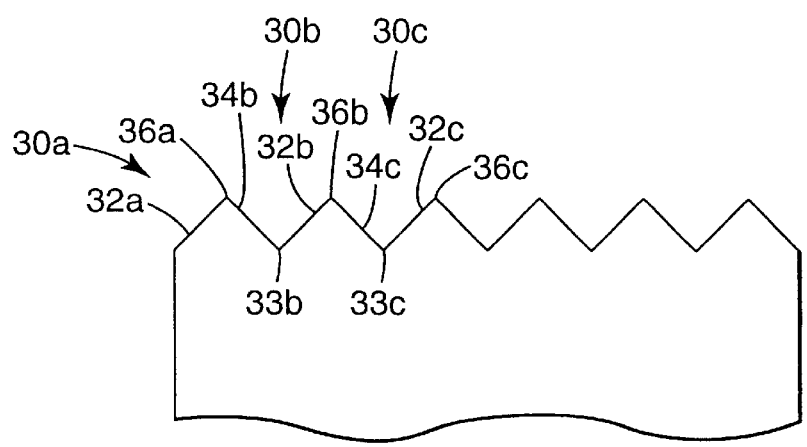
FIG. 19 is a side view of the plurality of laminae following a first machining operation.
Figure 20:
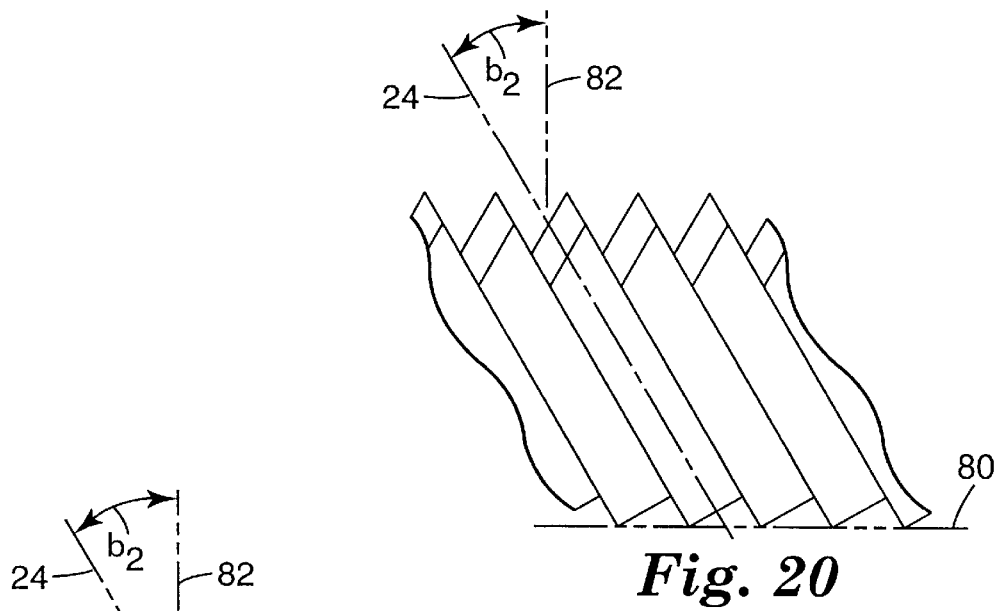
FIG. 20 is an end view of the plurality of laminae oriented in a second orientation.
Figure 21:
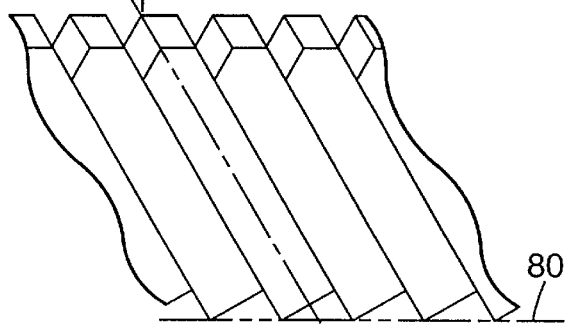
FIG. 21 is an end view of the plurality of laminae following a second machining operation.
Figure 22:
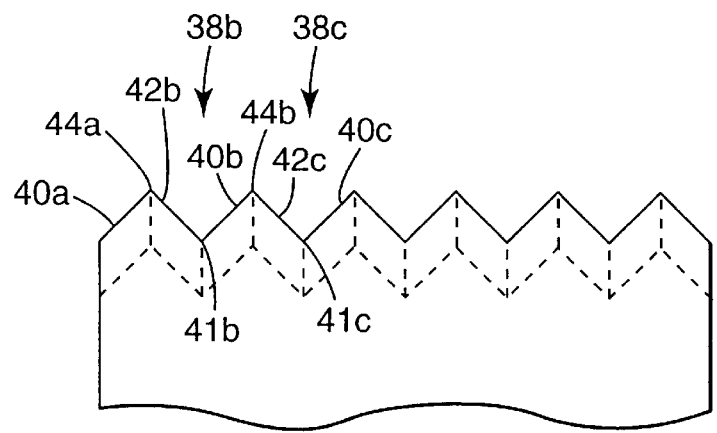
FIG. 22 is a side view of the plurality of laminae following a second machining operation.
Figure 23:
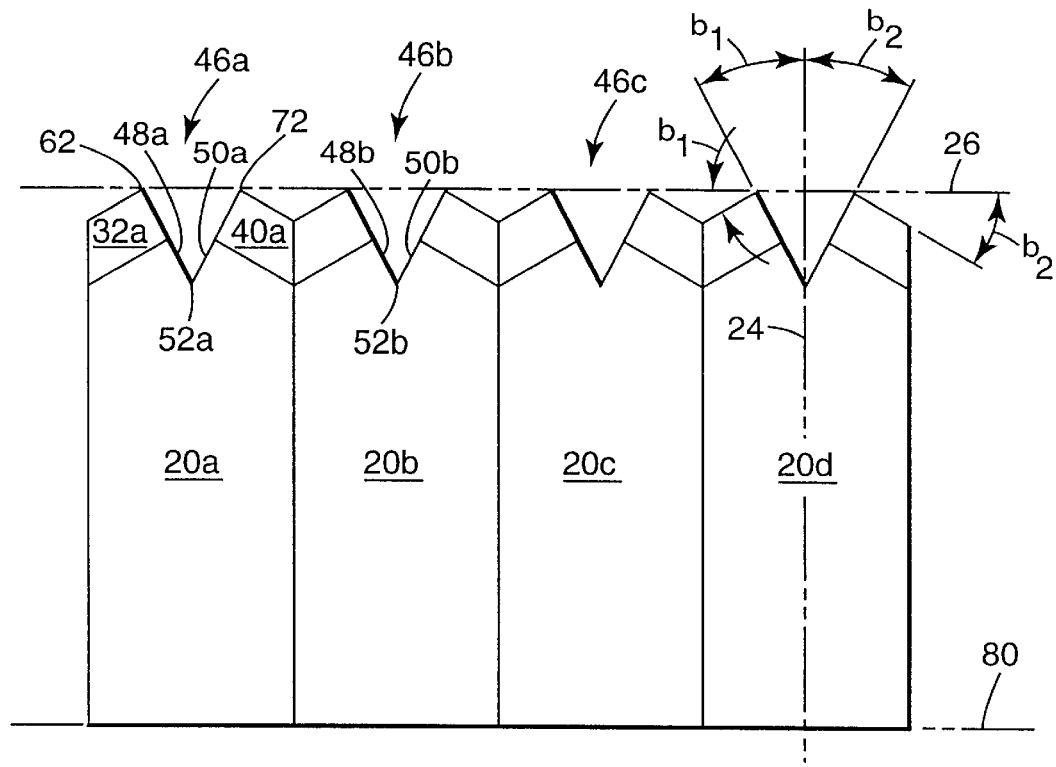
FIG. 23 is an end view of the plurality of laminae following a third machining operation.
Figure 24:
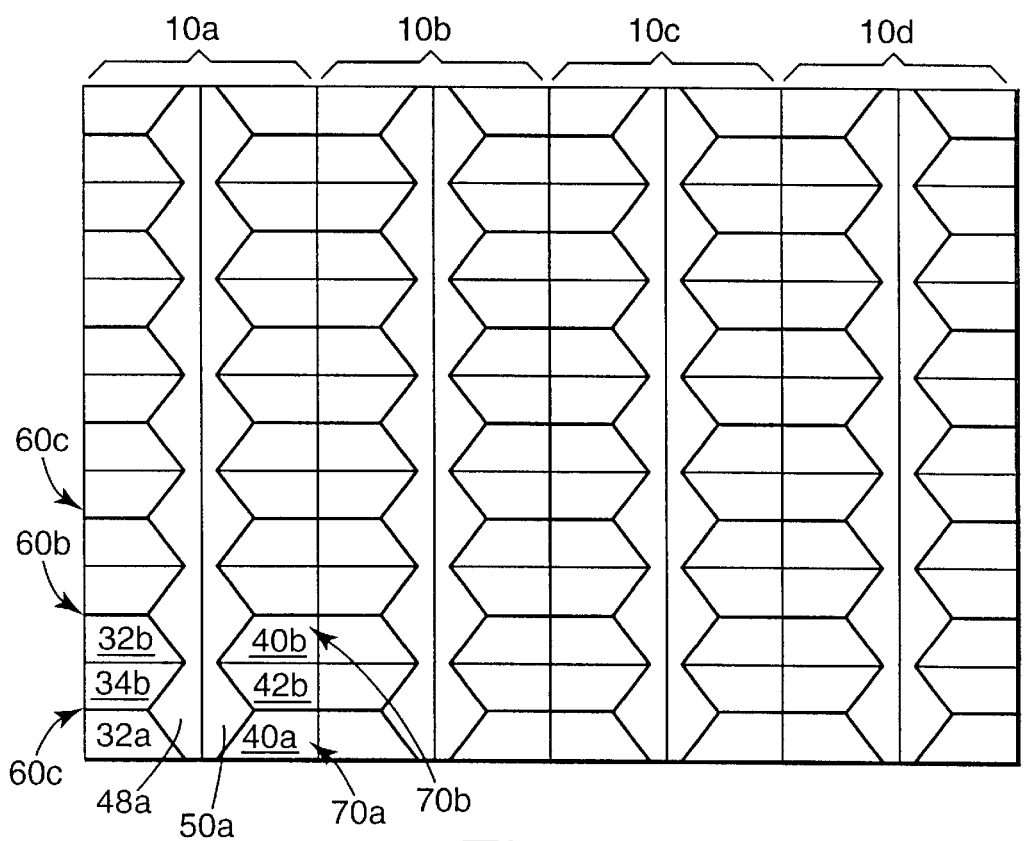
FIG. 24 is a top view of the plurality of laminae following a third machining operation.

FIGS. 16–24 present another method for forming a plurality of laminae suitable for use in a mold suitable for forming retroreflective articles. In the embodiment of FIGS. 16–24, a plurality of cube corner elements are formed in the working surfaces of a plurality of laminae while the laminae are held together in an assembly, rather than individually, as described above. The plurality of laminae 10 are preferably assembled such that their working surfaces 16 are substantially coplanar. In brief, the laminae 10 are oriented such that their respective first reference planes are disposed at a first angle, $\beta_1$, relative to a fixed reference axis 82 (FIG. 17). A first groove set including at least two V-shaped grooves is formed in the working surface 16 of the plurality of laminae 10 (FIGS. 18–19). The laminae are then oriented such that their respective first reference planes are disposed at a second angle, $\beta_2$, relative to the reference axis 82 (FIG. 20). A second groove set including at least two V-shaped grooves is formed in the working surface 16 of the plurality of laminae 10 (FIGS. 21–22). A third groove set that preferably includes at least one V-shaped groove in the working surface 16 of each lamina 10 is also formed (FIG. 23). Formation of the third groove set results in a structured surface that includes a plurality of cube corner elements on the working surface of the plurality of laminae 10 (FIG. 24).

FIGS. 16–24 will now be described in greater detail. In FIG. 16, a plurality of thin laminae 10 are assembled together such that the first major surface 12 of one lamina 10 is adjacent the second major surface 14 of an adjacent lamina 10. Preferably, the laminae 10 are assembled in a conventional fixture capable of securing the plurality of laminae adjacent one another. Details of the fixture are not critical. However, the fixture defines a base plane 80 which is preferably substantially parallel to the bottom surfaces 18 of the laminae 10 when the laminae 10 are positioned as depicted in FIG. 16. The plurality of laminae 10 can be characterized by a Cartesian coordinate system as described above. Preferably, the working surfaces 16 of the plurality of laminae 10 are substantially coplanar when the laminae are positioned with their respective first reference planes 24 perpendicular to base plane 80.

In FIG. 17, the laminae 10 are oriented to have their respective first reference planes 24 disposed at a first angle $\beta_1$, from a fixed reference axis 82 normal to base plane 80. In one embodiment, $\beta_1$ is approximately 27.8°. However, $\beta_1$ can alternately be between about 1° and about 85°, but more preferably is between about 10° and about 60°.

Referring to FIGS. 18–19, a first groove set comprising a plurality of parallel adjacent V-shaped grooves 30a, 30b, 30c, etc. (collectively referred to as 30) is formed in the working surfaces 16 of the plurality of laminae 10 with the lamina disposed at angle $\beta_1$. At least two adjacent grooves 30 are formed in working surface 16 of the plurality of laminae 10. The grooves 30 define first groove surfaces 32a, 32b, 32c, etc. (collectively referred to as 32) and second groove surfaces 34b, 34c, 34d, etc. (collectively referred to as 34) that intersect at groove vertices 33b, 33c, 33d, etc. (collectively referred to as 33) as shown. At the edge of the lamina, the groove forming operation may form a single groove surface 32a. Significantly, groove surfaces 32a and 34b of adjacent grooves intersect approximately orthogonally along a reference edge 36a. Similarly, adjacent groove surfaces 32b and 34c intersect approximately orthogonally along reference edge 36b. Preferably this pattern is repeated across the entire working surfaces 16 of the laminae 10.

The grooves 30 can be formed by removing portions of working surface 16 of the plurality of laminae using a wide variety of material removal techniques including precision machining techniques such as milling, ruling, grooving and fly-cutting, as well as chemical etching or laser ablation techniques. In one embodiment, the grooves 30 are formed in a high-precision machining operation in which a diamond cutting tool having a 90° included angle repeatedly moves transversely across the working surfaces 16 of the plurality of laminae 10 along an axis that is substantially parallel to base plane 80. The diamond cutting tool can alternately move along an axis that is non-parallel to base plane 80 such that the tool cuts at a varying depth across the plurality of laminae 10. It will also be appreciated that the machining tool can be held stationary while the plurality of laminae are placed in motion; any relative motion between the laminae 10 and the machining tool is contemplated.

In the embodiment of FIGS. 18–19, the grooves 30 are formed at a depth such that the respective first reference edges 36 intersect the first major surface 12 and the second major surface 14 of each lamina. Thus, in the end view depicted in FIG. 18, the reference edges 36 and groove vertices 33 form substantially continuous lines that extend along an axis parallel to base plane 80. Further, grooves 30 are formed such that the reference edges 36 are disposed in a plane that intersects the respective first reference planes 24 and the second reference plane 26 at orthogonal angles. Thus, in a top plan view analogous to FIG. 4, the first reference edges 36 would appear perpendicular to the respective first reference planes 24. However, the grooves 30 can also be formed at lesser depths, as depicted in FIGS. 2–4, or along different axes.

In FIG. 20, the laminae 10 are next oriented to have their respective first reference planes 24 disposed at a second angle $\beta_2$, from fixed reference axis 82 normal to base plane 80. In one embodiment, $\beta_2$ is approximately 27.8°. However, $\beta_2$ can alternately be between about 1° and about 85°, and preferably between about 10° and about 60°. The angle $\beta_2$ is independent of angle $\beta_1$ and need not be equal to $\beta_1$. To orient the plurality of laminae 10 at angle $\beta_1$, the laminae 10 are preferably removed from the fixture and reassembled with their respective first reference planes disposed at angle $\beta_2$.

In FIGS. 21–22, a second groove set comprising a plurality of parallel adjacent V-shaped grooves 38b, 38c, etc. (collectively referred to as 38) is formed in the working surfaces 16 of the laminae 10 with the laminae disposed at angle $\beta_2$ At least two adjacent grooves 38 are formed in working surface 16 of the plurality of laminae 10. The grooves 38 define third groove surfaces 40a, 40b, 40c, etc. (collectively referred to as 40) and fourth groove surfaces 42b, 42c, 42d, etc. (collectively referred to as 42) that intersect at groove vertices 41b, 41c, 41d, etc. (collectively referred to as 41) as shown, At the edge of the lamina, the groove forming operation may form a single groove surface 40a. Significantly, the groove surfaces 40a and 42b of adjacent grooves intersect approximately orthogonally along a reference edge 44a. Groove surfaces 40b and 42c likewise intersect approximately orthogonally along reference edge 44b. Preferably this pattern is repeated across the entire working surfaces 16 of the plurality of laminae 10.

Grooves 38 are also preferably formed by a high-precision machining operation in which a diamond cutting tool having a 90° included angle is repeatedly moved transversely across the working surfaces 16 of the plurality of laminae 10 along a cutting axis that is substantially parallel to base plane 80. It is important that the surfaces of adjacent grooves 38 intersect along the reference edges 44 to form orthogonal dihedral angles. The included angle of each groove can measure other than 90°, as will be discussed in connection with FIG. 15. Grooves 38 are preferably formed at approximately the same depth in working surface 16 of the plurality of laminae 10 as grooves 30 in first groove set. Additionally, the grooves 38 are preferably formed such that the groove vertices 41 are substantially coplanar with groove vertices 33, and the reference edges 44 are substantially coplanar with reference edges 36. After forming the grooves 38, each lamina 10 preferably appears as shown in FIG. 8.

In FIGS. 23–24, a third groove set that preferably includes at least one groove 46 in each lamina 10 is formed in the working surface 16 of the plurality of laminae 10. In the disclosed embodiment the third grooves 46a, 46b, 46c, etc. (collectively referred to as 46) define fifth groove surfaces 48a, 48b, 48c, etc. (collectively referred to as 48) and sixth groove surfaces 50a, 50b, 50c, etc. (collectively referred to as 50) that intersect at groove vertices 52a, 52b, 52c, etc. (collectively referred to as 52) along axes that are parallel to the respective first reference planes 24. Significantly, the third grooves 46 are formed such that respective fifth groove surfaces 48 are disposed in a plane that is substantially orthogonal to the respective first groove surfaces 32 and the respective second groove surfaces 34. Formation of the fifth groove surfaces 48 yields a plurality of cube corner elements 60a, 60b, etc. (collectively referred to as 60) in working surface 16 of the respective laminae 10.

Each cube corner element 60 is defined by a first groove surface 32, a second groove surface 34 and a portion of a fifth groove surface 48 that mutually intersect at a point to define a cube corner peak, or apex 62. Similarly, sixth groove surface 50 is disposed in a plane that is substantially orthogonal to the third groove surfaces 40 and the fourth groove surfaces 42. Formation of the sixth groove surface 50 also yields a plurality of cube corner elements 70a, 70b, etc. (collectively referred to as 70) in working surface 16 of laminae 10. Each cube corner element 70 is defined by a third groove surface 40, a fourth groove surface 42 and a portion of sixth groove surface 50 that mutually intersect at a point to define a cube corner peak, or apex 72. Preferably, both fifth groove surface 48 and sixth groove surface 50 form a plurality of cube corner elements on the working surface 16 of lamina 10. However, third groove 46 could alternately be formed such that only fifth groove surface 48 or sixth groove surface 50 forms cube corner elements.

The three mutually perpendicular optical faces 32, 40, 48 and 34, 42, 50 of each cube corner element 60, 70, respectively, are preferably formed on a single lamina. All three optical faces are preferably formed by the machining process to ensure optical quality surfaces. A planar interface 12, 14 is preferably maintained between adjacent laminae during the machining phase and subsequent thereto so as to minimize alignment problems and damage due to handling of the laminae.

In a preferred method the plurality of laminae 10 are re-oriented to have their respective first reference planes 24 disposed approximately parallel to reference axis 82 before forming the plurality of grooves 46. However, the grooves 46 can be formed with the lamina oriented such that their respective first reference planes are angled relative to reference axis 82. In particular, in some embodiments it may be advantageous to form the respective third grooves 46 with the respective lamina 10 disposed at angle $\beta_2$ to avoid an additional orientation step in the manufacturing process. Preferably, grooves 46 are also formed by a high precision machining operation. In the disclosed embodiment a diamond cutting tool having an included angle of 55.6° is moved across the working surface 16 of each lamina 10 along an axis that is substantially contained by the first reference plane 24 of the lamina 10 and that is parallel to base plane 80. Grooves 46 are preferably formed such that the respective groove vertices 52 are slightly deeper than the vertices of the grooves in the first and second groove sets. Formation of grooves 46 result in a plurality of laminae 10 having a structured surface substantially as depicted in FIG. 12.

Working surface 16 exhibits several desirable characteristics as a retroreflector. The cube corner element geometry formed in working surface 16 of lamina 10 can be characterized as a 'full' or 'high efficiency' cube corner element geometry because the geometry exhibits a maximum effective aperture that approaches 100%. Thus, a retroreflector formed as a replica of working surface 16 will exhibit high optical efficiency in response to light incident on the retroreflector approximately along the symmetry axes of the cube corner elements. Additionally, cube corner elements 60 and 70 are disposed in opposing orientations and are symmetrical with respect to first reference plane 24 and will exhibit symmetric retroreflective performance in response to light incident on the retroreflector at high entrance angles. It is not required, however, that the cube corner elements be symmetrical about the reference planes.

Figure 14:
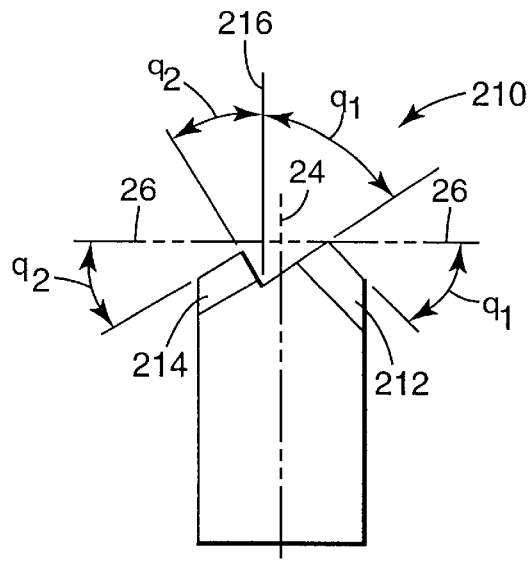
FIG. 14 is an end view of an alternate embodiment of a single lamina following a third machining step.
Figure 15:
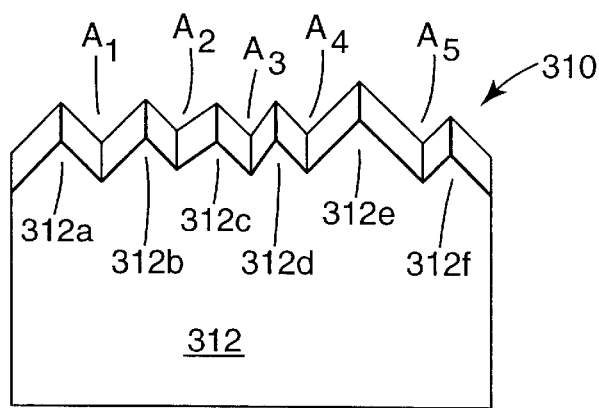
FIG. 15 is a side view of an alternate embodiment of a single lamina following a third machining step.

In the embodiments presented in FIGS. 1–12 and 16–24 the laminae were formed using consistent groove spacing, depths and tool angles to produce a working surface wherein the cube corner elements are substantially identical. However, these factors can be varied to produce a working surface having cube corner elements of different sizes, shapes and orientations. FIGS. 13–15 illustrate exemplary alternate embodiments lamina manufactured within the scope of the present disclosure.

FIG. 13 shows a lamina 110 that includes an array of cube corner elements 160a, 160b, 160c, etc. (collectively referred to as 160) disposed in a first orientation and an array of cube corner elements 170a, 170b, 170c, etc. (collectively referred to as 170) disposed in a second orientation. The lamina 110 of FIG. 13 is characterized by the various groove sets being formed at angles that are not, in plan view, perpendicular to the reference plane 24. Lamina 110 can be formed either individually or as part of an assembly, as described above, by forming the first and second groove sets such that the respective reference edges are disposed in planes that intersect the third reference plane 28 at an oblique angle, $\phi_1$, and that intersect the second reference plane 26 at an orthogonal angle. Similarly, the third groove is formed along an axis that intersects first reference plane 24 at an oblique angle, $\phi_1$. Indeed, in this instance each groove in the third groove set is formed along an axis intersecting the first reference plane 24 at oblique angle $\phi_1$. Additionally, the cube corner elements 160 are not aligned with the cube corner elements 170 on the lamina 110. Lamina 110 includes a plurality of cube corner elements having apertures of varying sizes and shapes. This variation in aperture size and shape may be desirable to accomplish certain optical objectives such as, for example, to enhance the uniformity of the retroreflection pattern of a retroreflective article formed as a replica of lamina 110.

FIG. 14 shows a lamina 210 in which the third groove 246 is formed along an axis 216 that is parallel to but displaced from first reference plane 24. Additionally, the angles $\theta_1$ and $\theta_2$ differ from one another such that the symmetry axes of the respective opposing cube corner elements 214, 216 are canted at different angles relative to second reference plane 26.

FIG. 15 shows a lamina 310 wherein the grooves $A_1, A_2, A_3, A_4, A_5$ in the first and/or second groove sets are formed with tools of varying included angles to yield a structured surface having a plurality of cube corner elements 312a, 312b, 312c, 312d, 312e and 312f of varying sizes and having varying included angles. By way of example, the first and second groove sets can have grooves whose included angle measures between about 10° and about 170°. For example, the grooves $A_1, A_4, A_5$ can measure 90°, while groove $A_2$ measures 105° and the groove $A_3$ measures 75°. Additionally, the respective peaks and vertices of the cube corner elements 312 are disposed at varying distances from the bottom surface 318 of the lamina 310. By way of example, the distance between adjacent reference edges in the first and second groove sets can measure between about 10 and about 1000 microns.

Methods described above enable the manufacture of a wide range of cube corner geometries. The size, orientation, and degree of canting of the cube corner elements formed on the surface of the plurality of laminae can be varied. Articles can be manufactured as replicas of the laminae. The preceding discussion disclosed several embodiments of cube corner geometries. The following paragraphs provide a generic description of the angular relationships between the faces of the cube corner elements such that one of ordinary skill in the art could produce a wide variety of cube corner element geometries.

FIGS. 25–27 present a top plan view and side elevation views of the working surface of a lamina 410 that has an opposing pair of cube corner elements 460, 470 formed therein. Lamina 410 can be characterized in 3-dimensional space by reference planes 424, 426 and 428, as discussed above. For purposes of illustration, cube corner element 460 can be defined as a unit cube having three substantially mutually perpendicular optical faces 432, 434, 448. Optical faces 432 and 434 are formed by opposing surfaces of parallel grooves 430a and 430b that intersect along a reference edge 436. Optical face 448 is formed by one surface of groove 446. Grooves 430a and 430b have respective vertices 433a and 433b that extend along axes that intersect third reference plane at an arbitrary angle $\phi$. Similarly, groove 446 extends along an axis that intersects first reference plane at an arbitrary angle φ. The angle φ corresponds to the degree of angular rotation of the cube corner element on the surface of the lamina. Subject to machining limitations, the angle φ can range from 0°, such that the groove sets are formed along axes substantially coincident with reference planes 424 and 428, to nearly 90°. Preferably, however φ is between 0° and 45°.

FIG. 26 presents a side elevation view of unit cube 460 taken along lines 26—26. A reference plane 456 is coincident with the vertex of groove 446 and is normal to second reference plane 426. Angle $\alpha_1$ defines the acute angle between cube face 448 and reference plane 456. Groove vertices 433a and 433b are disposed at an acute angle θ relative to second reference plane 426. FIG. 27 presents a side elevation view of unit cube 460 taken along lines 27—27. Planes 450a and 450b are coincident with the vertices 433a and 433b, respectively. The angle $\alpha_2$ defines the acute angle between cube face 432 and reference plane 450a. Similarly, the angle $\alpha_3$ defines the acute angle between cube face 434 and reference plane 450b.

A second Cartesian coordinate system can be established using the groove vertices that form unit cube 460 as reference axes. In particular, the x-axis can be established parallel to the intersection of plane 456 and second reference plane 426, the y-axis can be established parallel to the intersection of plane 450b and second reference plane 426, and the z-axis extends perpendicular to second reference plane 426. Adopting this coordinate system, unit normal vectors $N_1$, $N_2$ and $N_3$ can be defined for the unit cube surfaces 448, 432, and 434, respectively as follows:

$$N_1 = \cos(\alpha_1)j + \sin(\alpha_1)k$$

$$N_2 = \cos(\alpha_2)i - \sin(\theta)\sin(\alpha_2)j + \cos(\theta)\sin(\alpha_2)k$$

$$N_3 = -\cos(\alpha_3)i - \sin(\theta)\sin(\alpha_3)j + \cos(\theta)\sin(\alpha_3)k$$

Surfaces 432, 434 and 448 must be substantially mutually perpendicular. Thus, the dot products of the normal vectors equal zero.

$$N_1 \cdot N_2 = N_2 \cdot N_3 = N_1 \cdot N_3 = 0.$$

Therefore, the following conditions hold:

$$\alpha_1 = \theta; \text{and}$$

$$\tan(\alpha_2)\tan(\alpha_3) = 1.$$

Any set of angles $\alpha_1$, $\alpha_2$, $\alpha_3$ and θ meeting this criteria will form retroreflective cube corner elements. In practice, a manufacturer of retroreflective cube corner sheeting can select a value for angle $\alpha_1$ to orient the optical axis of the cube corner element at a desired angle relative to the base plane of the retroreflective sheeting formed as a replica of the mold. As stated above, the present disclosure contemplates minor deviations from perfect orthogonality designed to alter the characteristics of the pattern of retroreflected light.

The laminae are preferably formed from a dimensionally stable material capable of holding precision tolerances, such as machinable plastics (for example, polyethylene teraphthalate, polymethyl methacrylate, and polycarbonate) or metals (for example, brass, nickel, copper, or aluminum). The physical dimensions of the laminae are constrained primarily by machining limitations. The laminae preferably measure at least 0.1 millimeters in thickness, between 5.0 and 100.0 millimeters in height, and between 10 and 500 millimeters in width. These measurements are provided for illustrative purposes only and are not intended to be limiting. By way of example, the thickness of each lamina can measure between about 0.025 and about 5.00 millimeters, between about 0.025 and about 1.00 millimeters, between about 0.1 and about 1.00 millimeters, or between about 0.1 to about 0.6 millimeters.

In the manufacture of retroreflective articles such as retroreflective sheeting, the structured surface of the plurality of laminae is used as a master mold which can be replicated using electroforming techniques or other conventional replicating technology. The plurality of laminae can include substantially identical cube corner elements or may include cube corner elements of varying sizes, geometries, or orientations. The structured surface of the replica, referred to in the art as a 'stamper' contains a negative image of the cube corner elements. This replica can be used as a mold for forming a retroreflector. More commonly, however, a large number of positive or negative replicas are assembled to form a mold large enough to be useful in forming retroreflective sheeting. Retroreflective sheeting can then be manufactured as an integral material, e.g. by embossing a preformed sheet with an array of cube corner elements as described above or by casting a fluid material into a mold. Alternatively, the retroreflective sheeting can be manufactured as a layered product by casting the cube corner elements against a preformed film as taught in PCT application No. WO 95/11464 and U.S. Pat. No. 3,648,348 or by laminating a preformed film to preformed cube corner elements. By way of example, such sheeting can be made using a nickel mold formed by electrolytic deposition of nickel onto a master mold. The electroformed mold can be used as a stamper to emboss the pattern of the mold onto a polycarbonate film approximately 500 μm thick having an index of refraction of about 1.59. The mold can be used in a press with the pressing performed at a temperature of approximately 175° to 200° C.

Useful materials for making such reflective sheeting are preferably materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting are disclosed in U.S. Pat. No. 5,450,235 to Smith et al. The sheeting can also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer can be made of any transparent or opaque material, including colored materials, that can be effectively engaged with the disclosed retroreflective sheeting. Suitable backing materials include aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The backing layer or sheet can be sealed in a grid pattern or any other configuration suitable to the reflecting elements.

Sealing can be affected by use of a number of methods including ultrasonic welding, adhesives, or by heat sealing at discrete locations on the arrays of reflecting elements (see, e.g. U.S. Pat. No. 3,924,928). Sealing is desirable to inhibit the entry of contaminating such as soil and/or moisture and to preserve air spaces adjacent the reflecting surfaces of the cube corner elements.

If added strength or toughness is required in the composite, backing sheets of polycarbonate, polybutryate or fiber-reinforced plastic can be used. Depending upon the degree of flexibility of the resulting retroreflective material, the material may be rolled or cut into strips or other suitable designs. The retroreflective material can also be backed with an adhesive and a release sheet to render it useful for application to any substrate without the added step of applying an adhesive or using other fastening means.

The cube corner elements disclosed herein can be individually tailored so as to distribute light retroreflected by the articles into a desired pattern or divergence profile, as taught by U.S. Pat. No. 4,775,219. Typically the groove half-angle error introduced will be less than ±20 arc minutes and often less than ±5 arc minutes.

EXAMPLE

An assembly of approximately 25 laminae measuring 127.0 millimeters in length by 25.4 millimeters in height by 0.508 millimeters in thickness were assembled in a fixture substantially as depicted in FIG. 16. The laminae were formed from 70/30 brass and the first and second major surfaces of the plurality of lamina were polished to a surface roughness of approximately 0.005 to 0.025 microns. Wedge blocks having precisely formed inclined surfaces disposed at an angle of 27.8° from a reference axis normal to the base plane of the fixture retain the assembly in a fixed position such that the respective plurality of laminae have their first reference planes disposed at an angle of 27.8° from the reference axis. A first groove set was formed by moving a diamond machining tool transversely across the plurality of laminae along axes substantially perpendicular to the major surfaces of the laminae. The grooves were uniformly formed to a depth of approximately 0.154 millimeters and the groove vertices were separated by a distance of approximately 0.308 millimeters.

The plurality of laminae were then removed from the fixture and repositioned such that the first reference planes of the plurality of laminae were disposed at an angle of 27.8° from the reference axis. A second groove set was formed by moving a diamond machining tool transversely across the plurality of laminae along axes substantially perpendicular to the major surfaces of the laminae. The grooves were uniformly formed to a depth of approximately 0.154 millimeters and the groove vertices were separated by a distance of approximately 0.308 millimeters. Additionally, the grooves were formed along axes substantially coplanar with the axes of corresponding grooves in the first groove set.

The plurality of laminae were again removed from the fixture and were repositioned such that their respective first reference planes were substantially perpendicular to the base plane of the fixture. A third groove set was then formed by moving a diamond machining tool having a 55.6° included angle along an axis substantially coincident with the first reference plane of each lamina in the assembly. These machining steps resulted in a working surface including the positive image of an array of optically opposing cube corner elements substantially as depicted in FIG. 24.

The laminae were then removed from the assembly, cleaned, and reassembled in a fixture to form a master tooling. A nickel stamper tool was formed from the surface of the master tooling using chemical vapor deposition of nickel. The reflection coefficient of a specular nickel surface for incandescent light is about 0.62 to about 0.64. The percentage light return was measured for the nickel stamper arranged at an orientation angle of about zero and an entrance angle of about −4°. The percentage light return data was adjusted to correspond to a circular area with a diameter of about 26.99 millimeters (1.0625 inches). The incremental and cumulative percentage light return for various observation angles is set forth in Table 1 below:

TABLE 1

| Incremental Observation Angle | Incremental Percentage | Cumulative Percentage |
| --- | --- | --- |
| 0–0.1 | 4.764 | 4.76 |
| 0.1–0.2 | 8.438 | 13.20 |
| 0.2–0.3 | 3.500 | 16.70 |
| 0.3–0.4 | 0.639 | 17.34 |
| 0.4–0.5 | 0.592 | 17.93 |
| 0.5–0.6 | 0.359 | 18.29 |
| 0.6–0.7 | 0.259 | 18.55 |
| 0.7–0.8 | 0.209 | 18.76 |
| 0.8–0.9 | 0.181 | 18.9 |
| 0.9–1.0 | 0.167 | 19.1 |

For comparison, the percentage light return was measured for a nickel stamper tool used to make retroreflective sheeting with truncated cube corner elements according to U.S. Pat. No. 4,588,258 (Hoopman) having a base triangle of about 70°–55°–55°. The stamper tool was arranged at an orientation angle of about 180° and at an entrance angle of about −4°. The percentage light return data was for a circular area with a diameter of about 26.99 millimeters (1.0625 inches). The incremental and cumulative percentage light return for various observation angles is set forth in Table 2 below:

TABLE 2

| Incremental Observation Angle | Incremental Percentage | Cumulative Percentage |
| --- | --- | --- |
| 0–0.1 | 1.369 | 1.369 |
| 0.1–0.2 | 3.115 | 4.484 |
| 0.2–0.3 | 3.197 | 7.681 |
| 0.3–0.4 | 0.938 | 8.618 |
| 0.4–0.5 | 0.911 | 9.530 |
| 0.5–0.6 | 0.434 | 9.964 |
| 0.6–0.7 | 0.229 | 10.193 |
| 0.7–0.8 | 0.143 | 10.335 |
| 0.8–0.9 | 0.103 | 10.439 |
| 0.9–1.0 | 0.078 | 10.517 |

All patents and patent applications referred to, including those disclosed in the background of the invention, are hereby incorporated by reference. The present invention has now been described with reference to several embodiments thereof. It will be apparent to those skilled in the art that many changes can be made in the embodiments described without departing from the scope of the invention. Thus, the scope of the present invention should not be limited to the preferred structures and methods described herein, but rather by the broad scope of the claims which follow.

What is claimed is:

1. A lamina suitable for use in a mold for use in forming retroreflective cube corner articles, the lamina having opposing first and second major surfaces defining therebetween a first reference plane, the lamina further including a working surface connecting the first and second major surfaces, the lamina comprising:

two rows of cube corner elements in the working surface, at least one such row comprising a plurality of non-identical cube corner elements.

2. The lamina of claim 1, wherein the two rows of cube corner elements define therebetween a groove extending along the working surface of the lamina.

3. The lamina of claim 2, wherein at least one of the two rows of cube corner elements further define a set of parallel grooves.

4. The lamina of claim 3, wherein the set of parallel grooves comprises grooves of differing included angles.

5. The lamina of claim 3, wherein the set of parallel grooves comprises grooves having a nonuniform groove spacing.

6. A mold comprising the lamina of claim 1.

7. A cube corner article formed as a replica of the mold of claim 6.

8. A method of making a lamina suitable for use in a mold for use in forming retroreflective cube corner articles, the method comprising:

providing a lamina having opposing first and second major surfaces; and forming a first, second, and third groove set in the lamina to define two rows of cube corner elements extending therealong;

wherein the forming step is performed with the lamina registered in one position.

9. The method of claim 8, wherein the first groove set comprises a first plurality of parallel grooves, and wherein the second groove set comprises a second plurality of parallel grooves.

10. The method of claim 9, wherein the third groove set consists essentially of a single groove.

11. A method of making a mold for use in forming retroreflective cube corner articles, comprising making laminae according to the method of claim 8 and assembling the laminae together.

12. A method of making a retroreflective article, comprising making a mold according to claim 11 and forming the retroreflective article from the mold by at least one replication step.

* * * * *

UNITED STATES PATENT AND TRADEMARK OFFICE
CERTIFICATE OF CORRECTION

PATENT NO.    : 6,386,855 B1
DATED         : May 14, 2002
INVENTOR(S)   : Luttrell, Dan E.

It is certified that error appears in the above-identified patent and that said Letters Patent is hereby corrected as shown below:

Title page,
Item [54], insert -- METHOD -- following "AND" proceeding "OF".

Column 3,
Line 12, delete "(Stamni)" and insert in place thereof -- (Stamm) --.

Column 7,
Line 55, delete "Comer" and insert in place thereof -- Corner --.

Signed and Sealed this

Fifteenth Day of April, 2003

JAMES E. ROGAN
*Director of the United States Patent and Trademark Office*